US012476394B2

(12) United States Patent
Carrozzo, Jr. et al.

(10) Patent No.: US 12,476,394 B2
(45) **Date of Patent: *Nov. 18, 2025**

(54) MULTI-USE CONNECTOR FOR TRACER WIRE

(71) Applicant: Hubbell Incorporated, Shelton, CT (US)

(72) Inventors: John Kenneth Carrozzo, Jr., Torrington, CT (US); Michael Constatin von Kannewurff, Middlebury, CT (US); Stephen Andrew Skolozdra, Terryville, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,321

(22) Filed: Dec. 14, 2023

(65) Prior Publication Data

US 2024/0332836 A1 Oct. 3, 2024

Related U.S. Application Data

(63) Continuation of application No. 17/681,340, filed on Feb. 25, 2022, now Pat. No. 11,855,367, which is a (Continued)

(51) Int. Cl.
*H01R 11/20* (2006.01)
*H01R 4/24* (2018.01)

(Continued)

(52) U.S. Cl.
CPC ............... *H01R 11/20* (2013.01); *H01R 4/24* (2013.01); *H01R 4/70* (2013.01); *H01R 13/5216* (2013.01); *H01R 43/20* (2013.01)

(58) Field of Classification Search
CPC . H01R 11/20; H01R 4/24; H01R 4/70; H01R 13/5216; H01R 43/20
See application file for complete search history.

(56) References Cited

U.S. PATENT DOCUMENTS 3,804,971 A 4/1974 Bazille, Jr.
3,836,944 A 9/1974 Lawson (Continued)

OTHER PUBLICATIONS

NEPTCO Data Sheet, Water Blocking Connectors for Trace-Safe Utility Locating System. www.trace-safe.com, pp. 1-2, Apr. 8, 2015. (2 pages).

(Continued)

*Primary Examiner* — Travis S Chambers
(74) *Attorney, Agent, or Firm* — Wissing Miller LLP

(57) ABSTRACT

Trace wire connectors that include a cover that can be attached to a base and used to electrically interconnect two or more tracer wires without having to remove insulation from the tracer wires. The cover has multiple portals that permit one or more tracer wires to pass into an inner cavity of the cover. The base has multiple cradles on which tracer wires passing into the cavity can rest. The cover can be oriented relative to the base for use with a through tracer wire and a dead-end tracer wire, or for use with multiple dead-end tracer wires.

22 Claims, 16 Drawing Sheets

Related U.S. Application Data continuation of application No. 16/816,069, filed on Mar. 11, 2020, now Pat. No. 11,264,739.

(60) Provisional application No. 62/817,097, filed on Mar. 12, 2019.

(51) Int. Cl.

| | |
|---|---|
| ***H01R 4/70*** | (2006.01) |
| ***H01R 13/52*** | (2006.01) |
| ***H01R 43/20*** | (2006.01) |

(56) References Cited

U.S. PATENT DOCUMENTS

| | | | | |
|---|---|---|---|---|
| 4,062,615 | A | 12/1977 | Navarro | |
| 4,427,253 | A | 1/1984 | Smith et al. | |
| 4,643,512 | A | 2/1987 | Prodel | |
| 4,981,443 | A | 1/1991 | Suverison et al. | |
| 5,007,855 | A | 4/1991 | O'Brien et al. | |
| 5,080,606 | A | 1/1992 | Burkard | |
| 5,453,021 | A | 9/1995 | Smith | |
| 6,106,323 | A | 8/2000 | Elisei et al. | |
| 6,208,233 | B1 | 3/2001 | Stein, Sr. et al. | |
| 7,044,776 | B2 | 5/2006 | King, Jr. et al. | |
| 7,179,114 | B1 | 2/2007 | Kuzan et al. | |
| 7,223,132 | B2 | 5/2007 | King, Jr. et al. | |
| 7,335,050 | B2 | 2/2008 | Kirk et al. | |
| 7,416,434 | B2 | 8/2008 | Saha et al. | |
| 7,507,126 | B2 | 3/2009 | King, Jr. et al. | |
| 7,677,932 | B2 | 3/2010 | King, Jr. et al. | |
| 7,695,308 | B2 | 4/2010 | Allwood et al. | |
| 7,932,469 | B1 | 4/2011 | Shelton et al. | |
| 8,637,774 | B2 | 1/2014 | Hiner et al. | |
| 9,577,351 | B2 | 2/2017 | Martin | |
| 9,673,538 | B2 | 6/2017 | Pan et al. | |
| 10,326,216 | B2 | 6/2019 | Lybrand | |
| 10,541,478 | B1 | 1/2020 | King, Jr. et al. | |
| 11,264,739 | B2 * | 3/2022 | Carrozzo, Jr. | H01R 43/20 |
| 11,855,367 | B2 * | 12/2023 | Carrozzo, Jr. | H01R 11/20 |
| 2008/0254664 | A1 | 10/2008 | Hiner et al. | |
| 2015/0288078 | A1 | 10/2015 | King, Jr. et al. | |
| 2017/0098906 | A1 * | 4/2017 | Suzuki | H01R 13/5213 |

OTHER PUBLICATIONS

King Innovation Product Brochure, Dryconn Waterproof Connectors for use with Cathodic Installations, www.kinginnovation.com, pp. 1-2, Apr. 2012. (2 pages).

King Innovation Product Brochure, Dryconn Waterproof Connectors for use with Utility Tracer Lines, www. kinginnovation.com, pp. 1-2, Jul. 2014. (2 pages).

Copperhead Industries Product Brochure, SnackeBite Corrosion Proof Wire Connectors, www.copperheadwire.com, pp. 1-2, Jan. 11, 2011. (2 pages).

Copperhead Industries Catalog, www.copperheadwire.com, pp. 1-28, 2013. (28 pages).

Pro-Line Safety Products Company, Pro-Trace TW Connector Brochure, p. 1, Oct. 21, 2010. (2 pages).

Electric Motion Company, Inc, Test Report on Trace-Safe Connector, pp. 1-17, Jan. 2012. (17 pages).

NEPTCO Data Sheet, Trace-Safe Water Blocking Connectors for use with Trace-Safe Water Blocking Tracer Wire, www.trace-safe.com, p. 1, Jan. 17, 2012. (1 page).

International Search Report and Written Opinion in corresponding International Application No. PCT/US20/22155 mailed on Jun. 11, 2020. (6 pages).

International Preliminary Report on Patentability in corresponding International Application No. PCT/US02/22155 mailed on Sep. 23, 2021. (6 pages).

* cited by examiner

Fig. 1
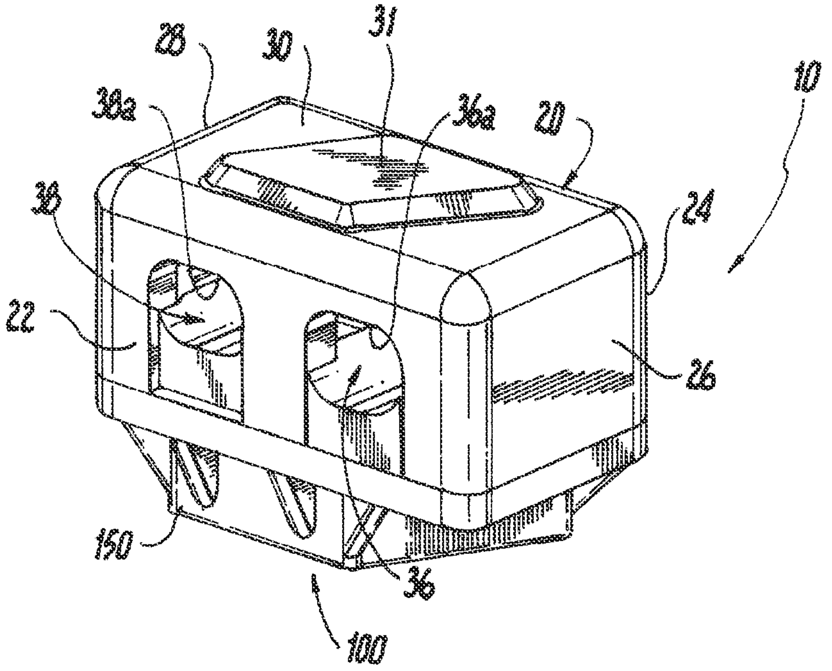
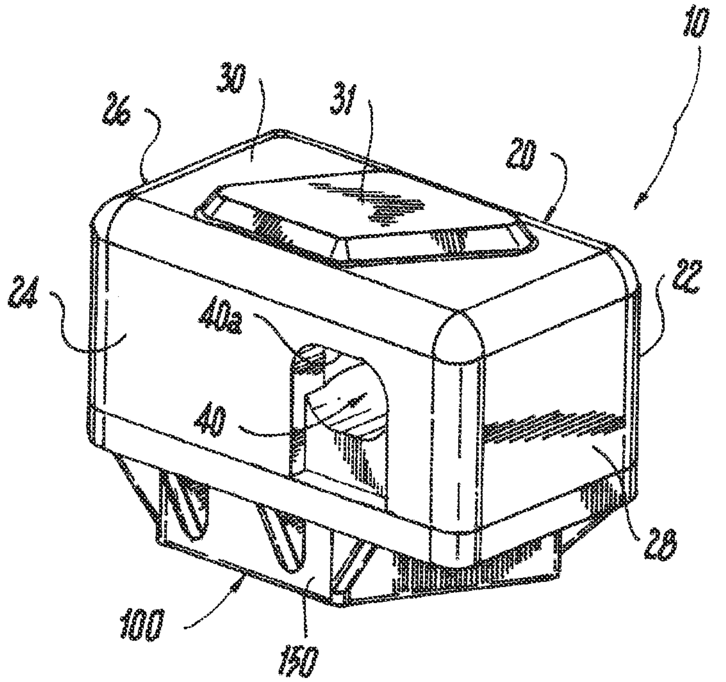
Fig. 2

Fig. 4
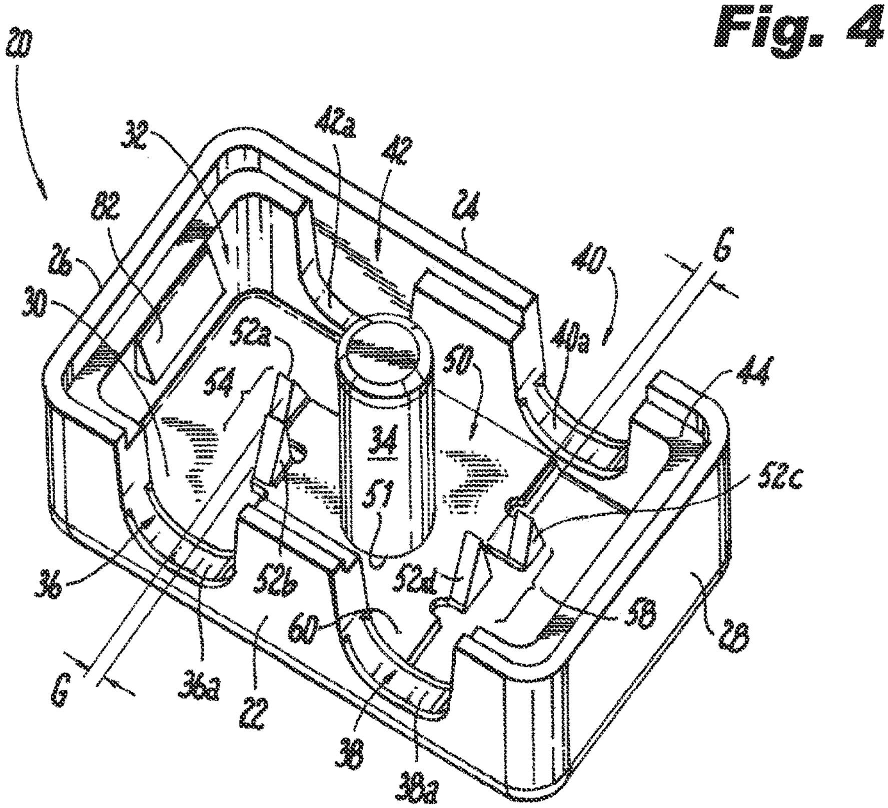
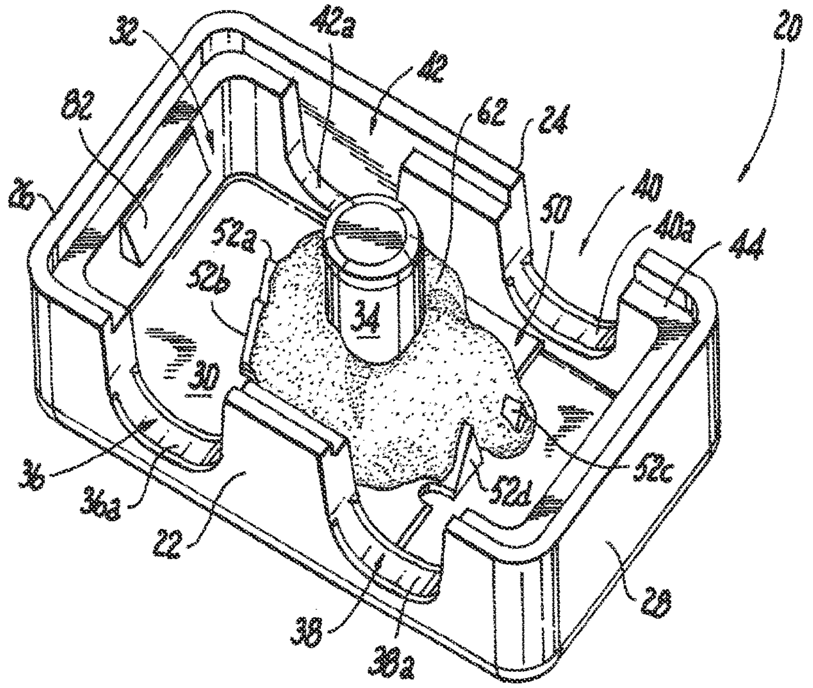
Fig. 5

Fig. 15
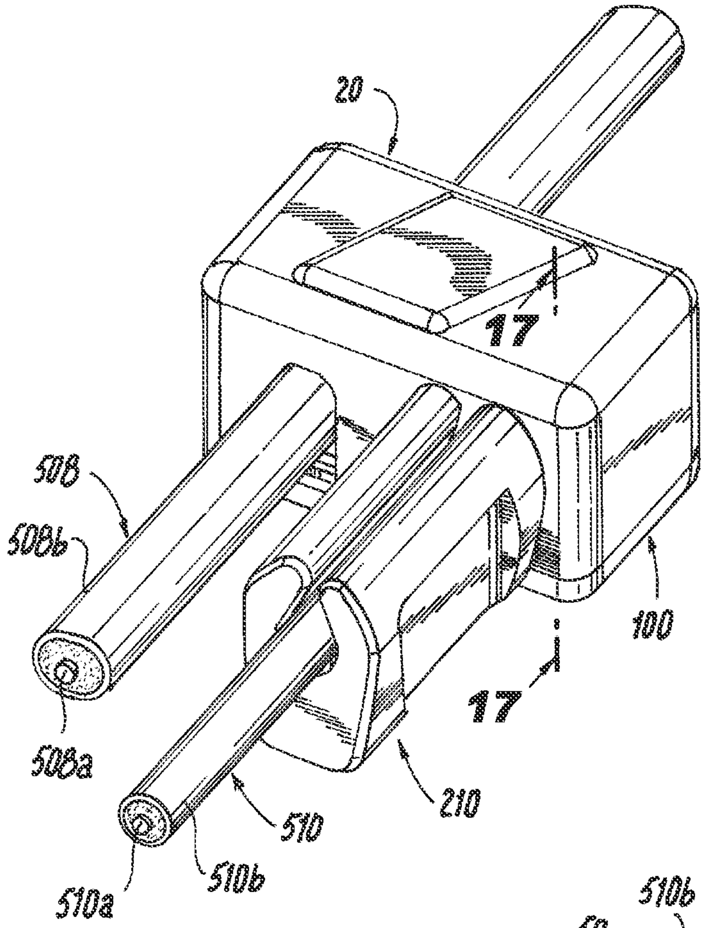
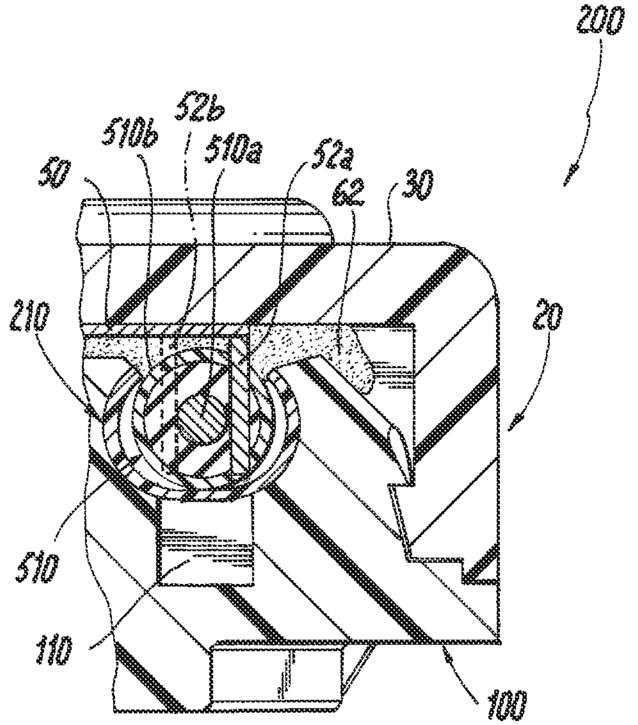
Fig. 17

MULTI-USE CONNECTOR FOR TRACER WIRE

CROSS-REFERENCE TO RELATED APPLICATIONS

This application is a continuation of application Ser. No. 17/681,340 filed Feb. 25, 2022 (now U.S. Pat. No. 11,855,367), which is a continuation of application Ser. No. 16/816,069 filed on Mar. 11, 2020 (now U.S. Pat. No. 11,264,739), and claims benefit from U.S. Provisional Application No. 62/817,097 filed on Mar. 12, 2019 the entire contents of each are incorporated herein by reference.

BACKGROUND

Field

The present disclosure relates generally to electrical connectors used to connect one or more wires or conductors together. More specifically, the present disclosure relates to tracer wire connectors used to connect two or more tracer wires together.

Description of the Related Art

Tracer wires are used when underground objects that are not electrically conductive need to be located after being buried. Such non-conductive objects include plastic water, electric, gas and sewer pipes, cement sewer pipes and fiber optic cables. Since non-conductive underground objects are difficult to detect and locate from above the ground, an electrical conductor, such as a tracer wire, is laid alongside the underground non-conductive underground objects while they are being buried. Knowing the existence of a tracer wire in proximity to a non-conductive underground object allows technicians to locate the non-conductive underground object by passing electrical current through the tracer wire and sensing the electrical field with an above ground detector, or by detecting the presence of the metallic cable forming the tracer wire. Connectors for tracer wires have been used to maintain an electrically conductive path between a main tracer wire and tap tracer wires.

SUMMARY

The present disclosure provides embodiments of tracer wire connectors for use with tracer wires. The tracer wire connector can be used to electrically interconnect multiple tracer wires buried underground. In an exemplary embodiment, the tracer wire connector includes a connector base and a cover. The connector base includes a plurality of cradles including a first cradle and a second cradle. The second cradle may have a plug at one end. The cover is attachable to the base and has an internal cavity that receives the plurality of cradles when the cover is attached to the base. The cover also includes a plurality of portals on a first side of the cover providing access to the cavity and at least one portal on a second side of the cover providing access to the cavity. The second side is preferably opposite the first side. When the cover is attached to the base in a first position, a first of the plurality of portals on the first side of the cover aligns with the first cradle and the at least one portal on the second side of the cover. In addition, a second of the plurality of portals on the first side of the cover aligns with the second cradle and is spaced from the plug. When the cover is attached to the base in a second position, the first of the plurality of portals on the first side of the cover aligns with the plug such that the plug and a portion of the second cradle are received in the first portal, and the second of the plurality of portals on the first side of the cover aligns with the first cradle, and the at least one portal on a second side of the cover aligns with the second cradle. The cover includes at least two insulation piercing members positioned within the cavity. The at least two insulation piercing members are electrically conductive and electrically coupled to each other. A first of the at least two insulation piercing members is aligned with the first cradle when the cover is attached to the base, and a second of the at least two insulation piercing members is aligned with the second cradle when the cover is attached to the base.

In an exemplary embodiment, the tracer wire connector includes a connector base and a cover. The connector base includes a plurality of cradles including a first cradle and a second cradle. The second cradle may have a plug at one end. The cover is attachable to the base. The cover includes an internal cavity that receives the plurality of cradles when the cover is attached to the base. The cover also includes first and second portals on a first side of the cover providing access to the cavity and a third portal on a second side of the cover providing access to the cavity. The second side of the cover is preferably opposite the first side of the cover. When the cover is attached to the base in a first position, the first portal aligns with the first cradle and the third portal, and the second portal aligns with the second cradle and is spaced from the plug. When the cover is attached to the base in a second position, the first portal aligns with the plug such that the plug and a portion of the second cradle are received in the first portal, and the second portal aligns with the first cradle, and the third portal aligns with the second cradle. The cover also includes at least two insulation piercing members positioned within the cavity. The at least two insulation piercing members are electrically conductive and electrically coupled to each other. A first of the at least two insulation piercing members is preferably aligned with the first cradle when the cover is attached to the base, and a second of the at least two insulation piercing members is preferably aligned with the second cradle when the cover is attached to the base.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 1 is a perspective view of a first side of an exemplary embodiment of a tracer wire connector according to the present disclosure, illustrating a base and a cover having multiple portals that are oriented for use with a through tracer wire and a dead-end tracer wire;

FIG. 2 is a perspective view of a second side of the tracer wire connector of FIG. 1;

FIG. 4 is an inverted perspective view of an exemplary embodiment of the cover of the tracer wire connector of FIG. 1, illustrating a tooth plate mounted to an interior of the cover and the multiple portals that permit multiple tracer wires to pass into or exit an interior of the cover;

FIG. 5 is an inverted perspective view of the cover of FIG. 4, illustrating the tooth plate mounted to the interior of the cover immersed within a sealing gel;

FIG. 15 is a perspective view of another exemplary embodiment of a tracer wire connector according to the present disclosure, illustrating a cover attached to a base, and a dead-end type adapter, where the cover is oriented for use with a through tracer wire and a dead-end tracer wire, and the dead-end type adapter is resting on one of the cradles on the base and extending from the cover;

FIG. 17 is a cross-sectional view of the tracer wire connector of FIG. 15 taken from line 17-17;

DETAILED DESCRIPTION

Figure 3:
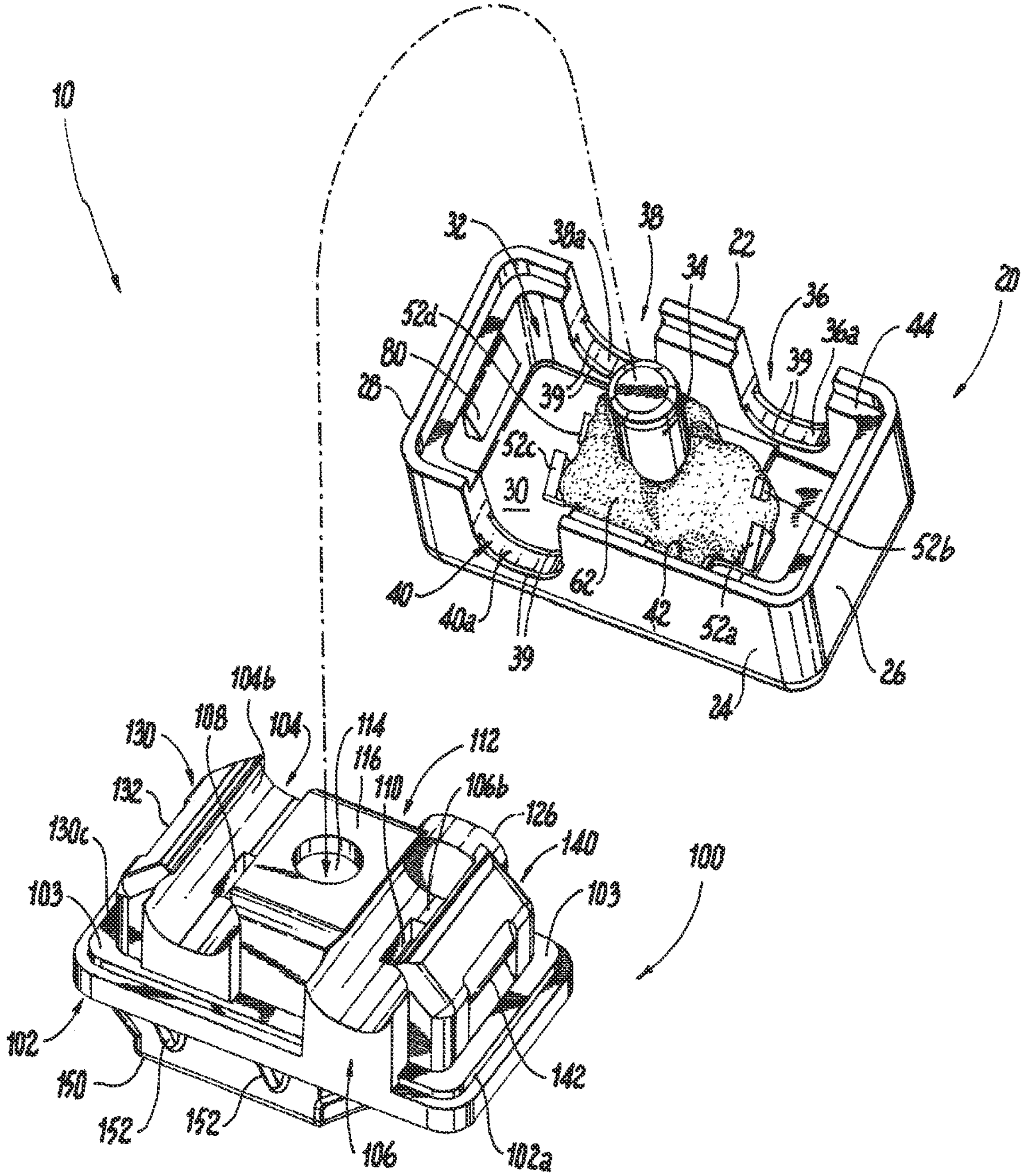
FIG. 3 is an exploded perspective view of the tracer wire connector of FIG. 1, illustrating a cover having a tooth plate and a sealing gel, and a base having a pair of wire cradles.

The present disclosure provides embodiments of trace wire connectors that include a cover that can be attached to a base. The cover has multiple portals that permit one or more tracer wires to pass through the tracer wire connector or to terminate within the tracer wire connector. The base has multiple cradles on which tracer wires passing through or terminating within the tracer wire connector can rest. The cover according to the present disclosure can be oriented for use with a through tracer wire and a dead-end tracer wire, or for use with multiple dead-end tracer wires. For ease of description, the tracer wire connector may also be referenced herein as the "connector" in the singular and the "connectors" in the plural. A through tracer wire is a tracer wire that passes through the connector and is often referred to as a main or run tracer wire. A dead-end tracer is a tracer wire that terminates in the connector. The tracer wire may be, for example, oval, oblong or round in cross-section, and includes a flexible electrical conductor encased in or surrounded by an insulating outer jacket. The tracer wire may come in many sizes or gauges typically ranging from, for example, about #6 AWG to about #24 AWG.

Referring to FIGS. 1-4, an exemplary embodiment of a connector according to the present disclosure is shown. In this exemplary embodiment, the connector 10 includes a cover 20 that can be attached to a base 100. The cover 20 can be attached to the base 100 using for example, fasteners or fastening assemblies. An example of a suitable fastening assembly includes mechanical fastening assemblies. Non-limiting examples of mechanical fastening assemblies include cantilever snap-fit assemblies that include a snap-beam and a snap-recess, annular snap-fit assemblies, torsional snap-fit assemblies, and a nut and bolt assembly. However, one skilled in the art would readily appreciate other fastener assemblies could be used to attach the cover 20 to the base 100. Further, one skilled in the art would readily appreciate that fasteners, such as adhesives, mechanical fasteners and/or welds, may be used to attach the cover 20 to the base 100.

Continuing to refer to FIGS. 1-4, an exemplary embodiment of the cover 20 is shown. In this exemplary embodiment, the cover 20 includes a first side wall 22, a second side wall 24, a first end wall 26, a second end wall 28, a top wall 30 and an open bottom. The side walls 22 and 24, the end walls 26 and 28 and the top wall 30 form a cavity 32 in an interior of the cover 20, as seen in FIG. 4. The side walls 22 and 24, the end walls 26 and 28 and the top wall 30 may be integral with or monolithically formed as a single structure. In an alternative embodiment, the side walls 22 and 24, the end walls 26 and 28 and the top wall 30 may be separate components joined together with, for example, adhesives or welds, e.g., sonic welds. In the exemplary embodiment shown, the side walls 22 and 24, the end walls 26 and 28 and the top wall 30 are formed as a monolithic structure. The top wall 30 includes a structural strengthening member 31, seen in FIGS. 1 and 2, that reinforces the cover 30 to withstand forces applied to the cover by tools used to attach the cover 20 to the base 100.

The cover 20 also includes an alignment post 34, seen in FIG. 4, extending from an inner surface of the top wall 30 into the cavity 32 of the cover 20. The alignment post 34 is used to align the cover 20 with the base 100 when attaching the cover to the base. The alignment post 34 preferably extends beyond the length of the side walls 22 and 24 and the end walls 26 and 28 to make it easier to align the cover 20 with the base 100.

Continuing to refer to FIGS. 1-4, the first side wall 22 includes two portals (or openings) 36 and 38 through which tracer wires can pass into the cavity 32 in the cover 20. The second side wall 24 includes a portal (or opening) 40 through which a tracer wire can pass into the cavity 32 in the cover 20. This configuration of the portals 36, 38 and 40 permits the cover 20 to be oriented relative to the base 100 for use with a through tracer wire and a dead-end tracer wire, or for use with multiple dead-end tracer wires, as described in more detail below. In this exemplary embodiment, the portals 36, 38 and 40 have a rounded or arched surface 36*a*, 38*a* and 40*a* in proximity to the top wall 30. The arched surface 36*a*, 38*a* and 40*a* of each respective portal is preferably configured to match the shape, e.g., the round, oval or oblong shape, of the insulating jacket of the tracer wire passing into the cavity 32. Confirming the shape of the arched surfaces 36*a*, 38*a* and 40*a* to the shape of the insulating jacket of the tracer wire helps provide a water-resistant seal between the trace wire and the cover 20 in the area of the respective portal 36, 38 and 40. As seen in FIG. 3, the interior walls of the portals 36, 38 and 40 including the arched surfaces 36*a*, 38*a* and 40*a* may include one or more sealing members 39 that further help to provide a water-resistant seal between the tracer wire and the cover 20. For example, the interior walls of the portals 36, 38 and 40 include two sealing members 39. The sealing members 39 may be raised surfaces extending from the interior walls of the portals 36, 38 and 40, such as V-shaped or rounded raised surfaces. In other embodiments, the sealing members may include gaskets or sealing strips secured to the interior walls of the portals using, for example, adhesives. Non-limiting examples of gaskets and strips include rubber and silicone gaskets and strips.

The second side wall 24 also includes an indentation 42, seen in FIG. 4, that is configured and dimensioned similar to the portals 36, 38 or 40, and includes an arched surface 42*a*. The indentation 42 receives a plug 126 on the base 100, seen in FIG. 8, as described in more detail below.

Figure 8:
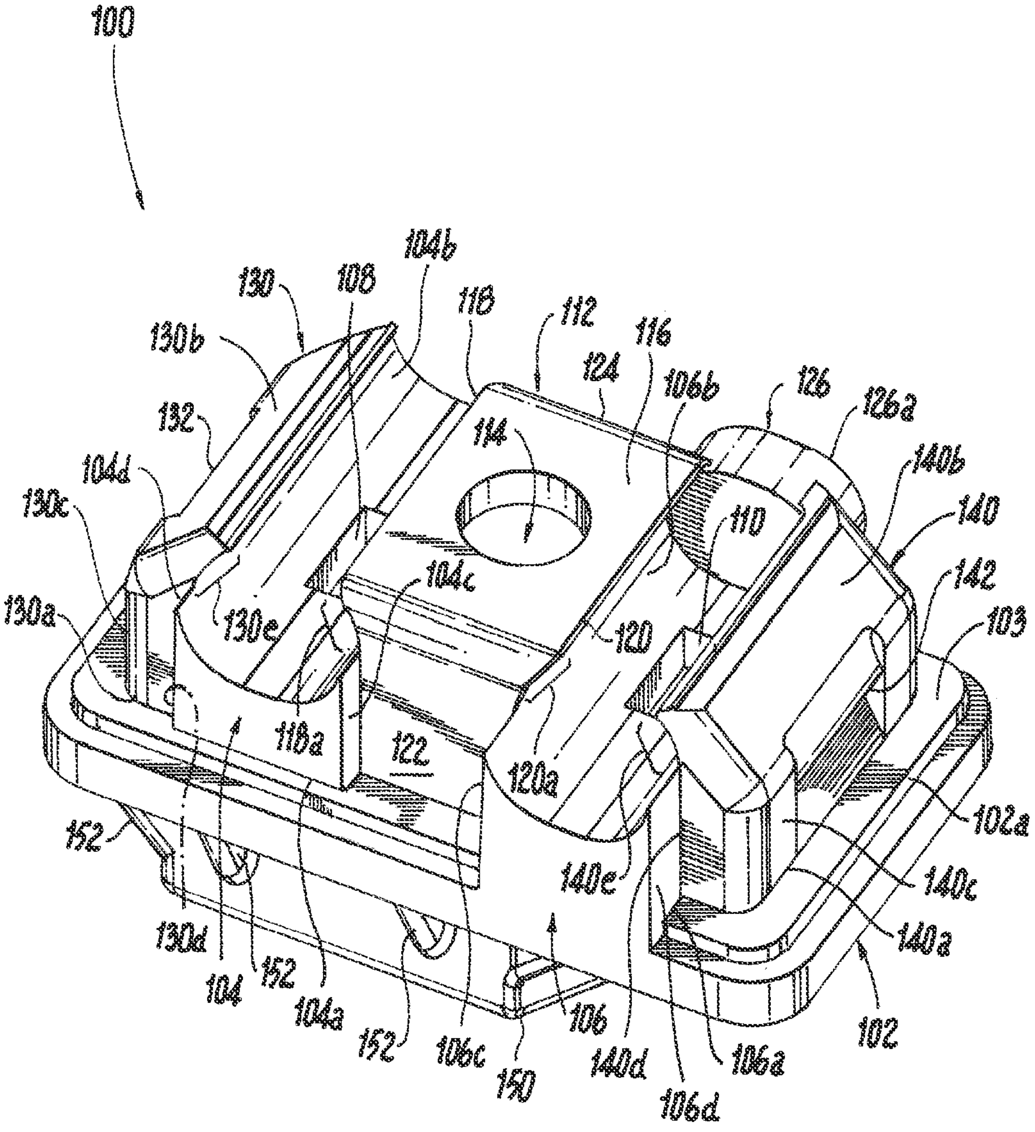
FIG. 8 is a perspective view of an exemplary embodiment of the base of the tracer wire connector of FIG. 1, illustrating a pair of tracer wire cradles and a plug positioned within one of the cradles.

Referring to FIGS. 4 and 8, to facilitate a water-resistant seal between the cover 20 and the base 100, a ledge 44, seen in FIG. 4, extends along a bottom surface of the first and second side walls 22 and 24, and the bottom surface of the end walls 26 and 28. The ledge 44 is configured to mate with a rim 103 on the base 100, seen in FIG. 8, when the cover 20 is attached to the base, as described in more detail below. The ledge 44 and rim 103 form a water-resistant seal between the cover 20 and the base 100. A sealing member (not shown), such as a gasket, may be positioned on the ledge 44 to further improve the water-resistant seal between the ledge 44 of the cover 20 and the rim 103 of the base 100.

Referring again to FIG. 4, the cover 20 also includes an electrically conductive jumper plate 50 secured to an interior or underside surface of the top wall 30, as shown. For ease of description, the electrically conductive jumper plate 50 may also be referred to herein as the "jumper plate." The jumper plate 50 includes an aperture 51 to permit the jumper plate to fit over the alignment post 34 extending from the top surface 30 of the cover 20. The jumper plate 50 includes one or more insulation piercing members 52 extending from the jumper plate. The insulating piercing members 52 act as electrical contacts. For ease of description the insulation piercing members 52 may be identified in the figures with alphanumeric characters such as 52*a*, 52*b*, 52*c*, and 52*d*, to identify different insulation piercing members 52. In the embodiment shown, the jumper plate 50 includes two pairs of insulation piercing members 52, where the first pair 54 of insulation piercing members 52*a* and 52*b* are on a first side 56 of the jumper plate 50, and the second pair 58 of insulation piercing members 52*c* and 52*d* are on a second side 60 of the jumper plate. The first pair 54 of insulation piercing members 52*a* and 52*b* extend from the first side 56 of the jumper plate 50 so that there is a gap "G" between an inner surface of the insulation piercing member 52*a* and an outer surface of the insulation piercing member 52*b*. The gap "G" is configured to receive the electrical conductor in the tracer wire so that the outer periphery of the electrical conductor contacts the inner surface of the insulation piercing member 52*a* and the outer surface of the insulation piercing member 52*b*. For example, if the electrical conductor in the tracer wire is a #10 AWG conductor, the gap "G" would be about the approximate outer diameter of #10 AWG conductors. Similarly, the second pair 54 of insulation piercing members 52*c* and 52*d* extend from the second side 60 of the jumper plate 50 so that there is a gap "G" between an inner surface of the insulation piercing member 52*c* and an outer surface of the insulation piercing member 52*d*. The gap "G" is configured to receive an electrical conductor in a tracer wire so that the outer periphery of the electrical conductor contacts the inner surface of the insulation piercing member 52*c* and the outer surface of the insulation piercing member 52*d*. In the exemplary embodiment shown, the insulation piercing members 52 extend substantially perpendicular from the jumper plate 50. However, the insulation piercing members 52 may extend from the jumper plate 50 so that they are at an acute or obtuse angle relative to the jumper plate 50.

Continuing to refer to FIG. 4, the insulation piercing members 52 may come in different shapes and sizes configured and dimensioned to pierce or cut through one or more insulating jackets surrounding an electrical conductor within the tracer wire. For example, in the embodiment shown in FIG. 4, the insulation piercing members 52 are triangular shaped members, e.g., teeth, with flat side surfaces having a sufficient surface area so that the electrical conductor in the tracer wire contacts the flat side surface of the insulation piercing members. Other examples of the shape of the insulation piercing members 52 include, cone-shaped insulation piercing members, cylindrical insulation piercing members with a pointed tip, or flat plates with a serrated edge to pierce through the insulation jacket surrounding the electrical conductor in the tracer wire.

The insulation piercing members 52 according to the present disclosure are preferably made of an electrically conductive material that is sufficiently rigid to pierce through one or more insulation jackets surrounding an electrical conductor within the tracer wires. Non-limiting examples of such materials include hardened copper, hardened aluminium, stainless steel or hardened brass. Preferably, the jumper plate 50 and insulating piercing members 52 are made of the same material. In another exemplary embodiment, the jumper plate 50 and insulating piercing members 52 can be made of an electrically conductive material where the insulation piercing members 52 are hardened using conventional hardening processes, such as heating and rapidly cooling the insulating piercing members 52. Non-limiting examples of the electrically conductive materials include brass and copper.

Referring to FIG. 5, another exemplary embodiment of the cover of the connector 10 is shown. In this exemplary embodiment, the cover 20 is substantially similar to the cover described above except that insulating material 62 is disposed within cavity 32 of the cover 20 so that the insulation piercing members 52 and possibly the jumper plate 50 are embedded within the insulating material. The insulating material 62 according to the present disclosure is a displaceable material where the insulating material displaces, disburses or otherwise spreads out when the cover 20 is attached to the base 100. More specifically, when the cover 20 is attached to the base 100, the insulation piercing members 52 pierce through insulating jacket surrounding the tracer wire and the insulating material 62 displaces to surround the junctions between the insulation piercing members 52 and the insulation jacket of the tracer wire enabling the insulating material 62 to fill any spaces at the junction between the insulation piercing members 52 and the insulation jacket. As a result, any exposed electrical conductors in the tracer wire would be covered by the insulating material 62. In an exemplary embodiment of the present disclosure, the insulating material 62 is silicone grease. However, it will be readily apparent to those skilled in the art that other insulating materials that can spread-out, disburse or be displaced can be suitable for use in the tracer wire connector of the present disclosure.

Figure 6:
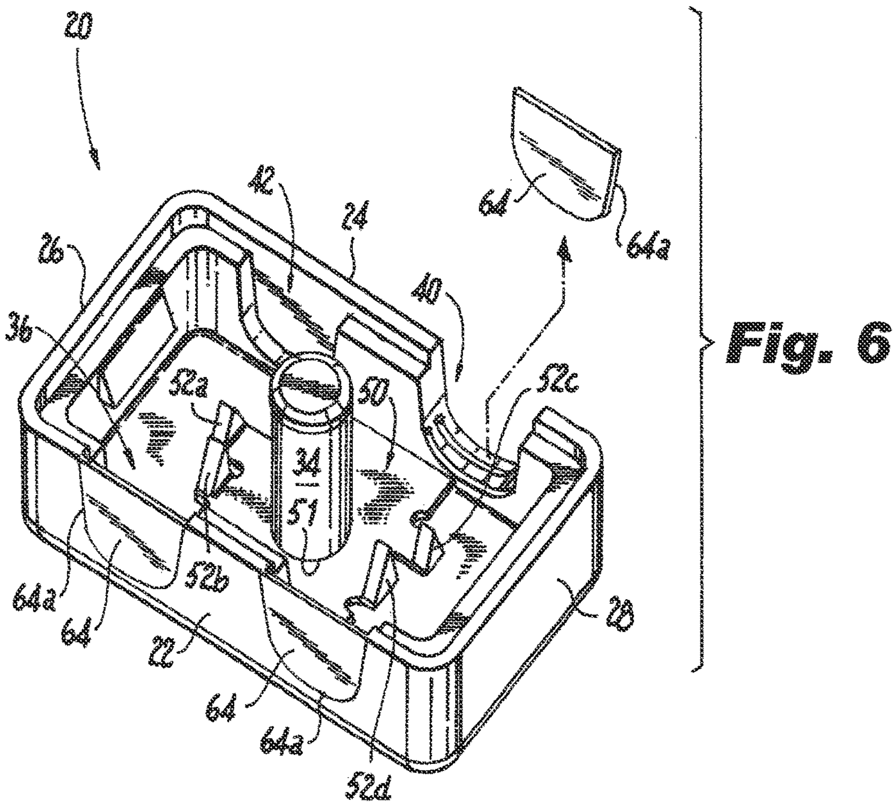
FIG. 6 is an inverted perspective view of another exemplary embodiment of the cover of the tracer wire connector of FIG. 1, illustrating multiple portals each having a pry-out that blocks access through the portal.

Referring to FIG. 6, another exemplary embodiment of the cover of the connector 10 is shown. In this exemplary embodiment, the cover 20 is substantially similar to the cover described above except that a pry-out 64 covers each portal 36, 38 and 40 blocking access to the cavity 32 of the cover 20. The pry-outs 64 seal the portals 36, 38 and 40 until removed to permit a tracer wire to pass through the respective portal into the cavity 32. The pry-outs 64 are attached to the cover 20 with a narrower edge 64*a* that permits the pry-out to be manually twisted or otherwise articulated to break away from the inner surface of the respective portal 36, 38 and/or 40.

Figure 7:
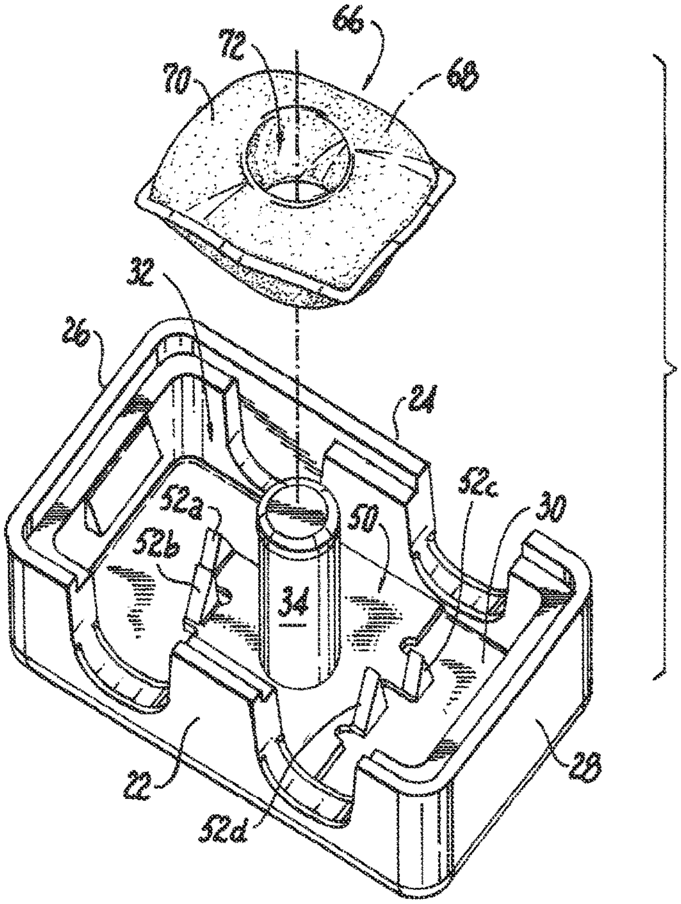
FIG. 7 is an inverted perspective view of another exemplary embodiment of the cover of the tracer wire connector of FIG. 1, illustrating a tooth plate mounted to an interior of the cover, and a gel pack that is positioned over the tooth plate.

Referring to FIG. 7, another exemplary embodiment of the cover of the connector 10 is shown. In this exemplary embodiment, the cover 20 is substantially similar to the cover described above except that an insulating pod 66 can be disposed within cavity 32 of the cover 20 and used to provide an electrical and environmental insulating layer at the junction between the insulation piercing members 52 and the insulating jacket of the tracer wire. The insulating pod 66 includes an insulating material 68 encased within a pouch 70. The pouch 70 can be made of any suitable material that can encase the insulating material 68 and that can be punctured or otherwise opened to release the insulating material allowing the insulating material to spread out, disburse or displace. Non-limiting examples of suitable pouch materials include thin film plastics, water soluble polymers and paper. In this exemplary embodiment, the pouch 70 includes a central aperture 72 that is configured and dimensioned to fit around the alignment post 34 extending from the inner surface of the top wall 30. The central aperture 72 in the pouch 70 can provide a friction fit that holds the insulating pod 66 to the alignment post 34 within the cavity 32. By holding the insulating pod 66 in position on the alignment post 34, the insulating pod is aligned with the insulation piercing members 52 so that the insulation piercing members 52 can pierce through the pouch 70 allowing insulating material 68 within the pouch to disburse, displace or otherwise spread out. The insulating material 68 according to this exemplary embodiment of the present disclosure is a disbursable or displaceable material where the insulating material spreads-out, disburses or displaces when the cover 20 is attached to the base 100. More specifically, when the cover 20 is attached to the base 100, the insulation piercing members 52 pierce through the pouch 70 of the insulation pod 66 permitting the insulating material 68 to be released from the pouch and surround the junction between the insulation piercing members 52 and the insulating jacket of the tracer wire, enabling the insulating material 68 to fill any spaces between the insulation piercing members 52 and the insulation jacket. As a result, any exposed electrical conductors in the tracer wire would be covered by the insulating material 68. In an exemplary embodiment of the present disclosure, the insulating material 62 is silicone grease. However, it will be readily apparent to those skilled in the art that other insulating materials that can spread-out, disburse or be displaced can be suitable for use in the tracer wire connector 10 of the present disclosure.

Turning now to FIG. 8, an exemplary embodiment of the base 100 according to the present disclosure is shown. In this exemplary embodiment, the base 100 includes platform 102 having a raised surface 102*a*. The perimeter portion of the raised surface 102*a* of the platform 102 forms a rim 103 that mates or otherwise interacts with the ledge 44 in the cover 20 to form a water-resistant seal between the cover 20 and the platform 102 when the cover is attached to the base 100.

Continuing to refer to FIG. 8, a first cradle 104 is positioned on the raised surface 102*a* and a second cradle 106 is positioned on the raised surface 102*a* and spaced from the first cradle 104 as shown. The first cradle 104 includes a bottom surface 104*a* that is integral with or monolithically formed into the platform 102, or secured to the platform 102 using adhesives or welds, e.g., sonic welds. The first cradle 104 includes a top surface 104*b* on which the tracer wire is to rest. The top surface 104*b* may be arched, e.g., rounded, oval or oblong or other shape, to conform to the shape of the insulating jacket of the tracer wire. A channel 108 may be formed in the first cradle 104 that is accessible from the top surface 104*b*. The channel 108 may be configured and dimensioned to receive at least a portion of one of the pairs 54 or 56 of insulation piercing members 52. The second cradle 106 includes a bottom surface 106*a* that is integral with or monolithically formed into the platform 102, or secured to the platform 102 using adhesives or welds, e.g., sonic welds. The second cradle 106 includes a top surface 106*b* on which the tracer wire is to rest. The top surface 106*b* may be arched, e.g., rounded, oval, oblong or other shape, to conform to the shape of the insulating jacket of the tracer wire. A channel 110 may be formed in the second cradle 106 that is accessible from the top surface 106*b*. The channel 110 may be configured and dimensioned to receive at least a portion of one of the pairs 54 or 56 of insulation piercing members 52. In the exemplary embodiment shown in FIG. 8, the top surface 104*b* of the first cradle 104 and the top surface 106*b* of the second cradle 106 are arched to confirm to the shape of Trace-Safe® tracer wire, manufactured by Neptco, Inc. of Pawtucket, RI.

Continuing to refer to FIG. 8, a strut 112 is positioned on the platform between a first side 104*c* of the first cradle 104 and a first side 106*c* of the second cradle 106. The strut 112 includes an aperture 114 configured to receive the alignment post 34 extending from the inner surface of the top wall 30 of the cover 20, seen in FIG. 3. A top surface 116 of the strut 112 acts to resist excess compression of the cover 20 relative to the base 100 when the cover is attached to the base. The strut 112 has side walls 118 and 120, and end walls 122 and 124. Each side wall 118 and 120 has an upper area 118*a* and 120*a*, respectively, that forms an overhang that helps to grip and maintain a tracer wire within the respective cradle 104 or 106. The overhang may be arched, e.g., rounded, oval, oblong or other shape, to conform to the shape of the insulating jacket of the tracer wire. In the exemplary embodiment shown in FIG. 8, the upper areas 118*a* and 120*a* of the respective side walls 118 and 120, i.e., the overhangs, are arched to confirm to the shape of Trace-Safe® tracer wire, manufactured by Neptco, Inc. of Pawtucket, RI.

Continuing to refer to FIG. 8, the base 100 also includes a first gripper member 130 positioned adjacent a second side 104*d* of the first cradle 104. The first gripper member 130 is used to help grip and maintain a tracer wire within the first cradle. More specifically, in the exemplary embodiment shown, the first gripper member 130 has a bottom surface 130*a*, a top surface 130*b*, an outer wall 130*c* and an inner wall 130*d* that is adjacent the strut 112. The bottom surface 130*a* is integral with or monolithically formed into the platform 102, or secured to the platform 102 using adhesives or welds, e.g., sonic welds. The outer wall 130*c* includes one or more snap-recesses 132 used to secure the cover 20 to the base 100 as described below. The inner wall 130*d* has an upper area 130*e* that forms an overhang that helps to grip and maintain a tracer wire within the first cradle 104. The overhang 130*e* may be arched, e.g., rounded, oval, oblong or other shape, to conform to the shape of the insulating jacket of the tracer wire. In the exemplary embodiment shown in FIG. 8, the upper area 130*e*, i.e., the overhang, is arched to confirm to the shape of Trace-Safe® tracer wire, manufactured by Neptco, Inc. of Pawtucket, RI. The base 100 also includes a second gripper member 140 positioned adjacent a second side 106*d* of the second cradle 106. The second gripper member 140 is used to help grip and maintain a tracer wire within the second cradle 106. More specifically, in the exemplary embodiment shown, the second gripper member 140 has a bottom surface 140*a*, a top surface 140*b*, an outer wall 140*c* and an inner wall 140*d* that is adjacent the strut 112. The bottom surface 140*a* is integral with or monolithically formed into the platform 102, or secured to the platform 102 using adhesives or welds, e.g., sonic welds. The outer wall 140*c* includes one or more snap-recesses 142 used to secure the cover 20 to the base 100 as described below. The inner wall 140*d* has an upper area 140*e* that forms an overhang that helps to grip and maintain a tracer wire within the second cradle 106. The overhang 140*e* may be arched, e.g., rounded, oval, oblong or other shape, to conform to the shape of the insulating jacket of the tracer wire. In the exemplary embodiment shown in FIG. 8, the upper area 140*e*, i.e., the overhang, is arched to confirm to the shape of Trace-Safe® tracer wire, manufactured by Neptco, Inc. of Pawtucket, RI.

Figure 9:
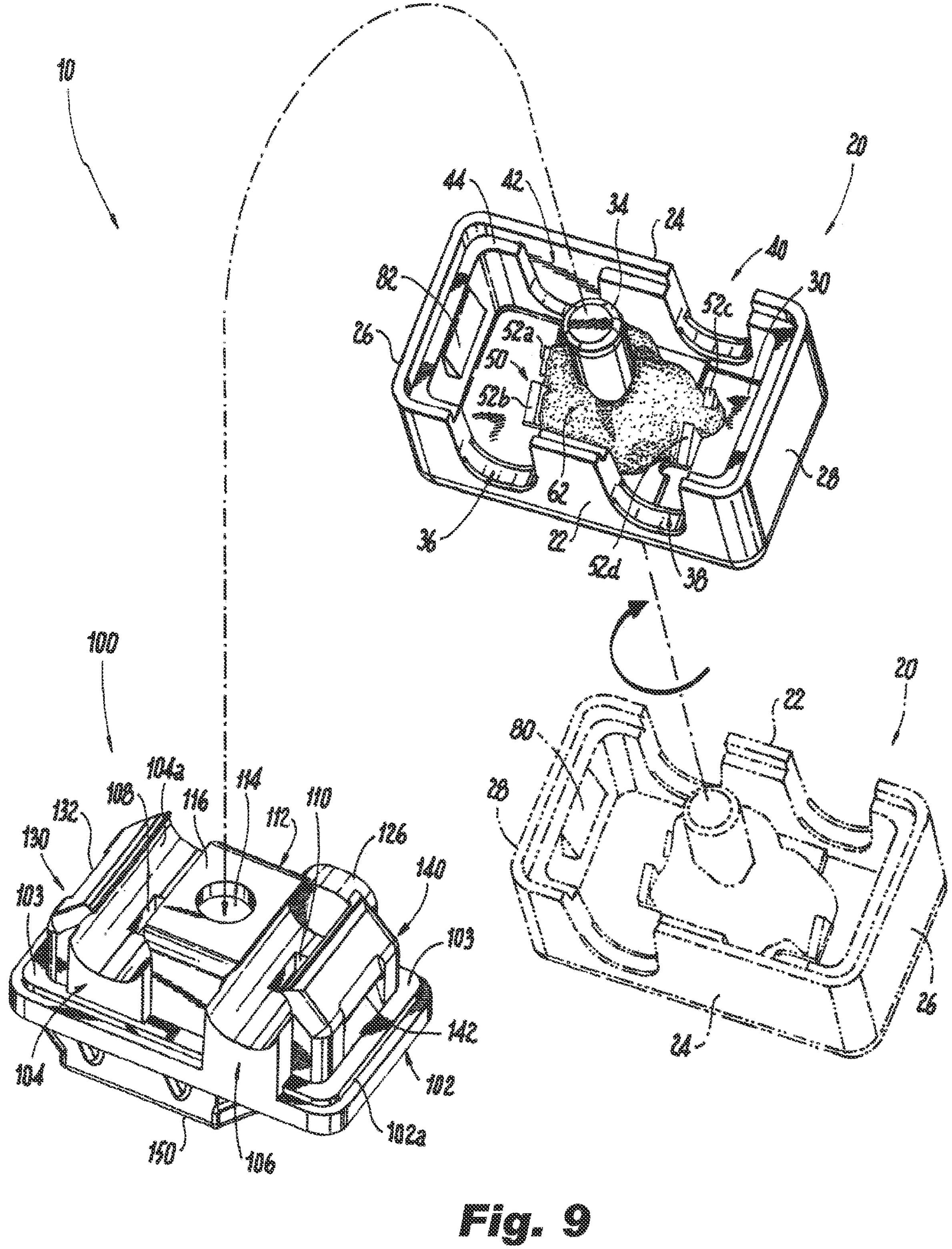
FIG. 9 is a perspective view of the tracer wire connector of FIG. 1 with the cover removed from the base, and illustrating rotation of the cover relative to the base so that the cover is oriented for use with multiple dead-end tracer wires.
Figure 10:
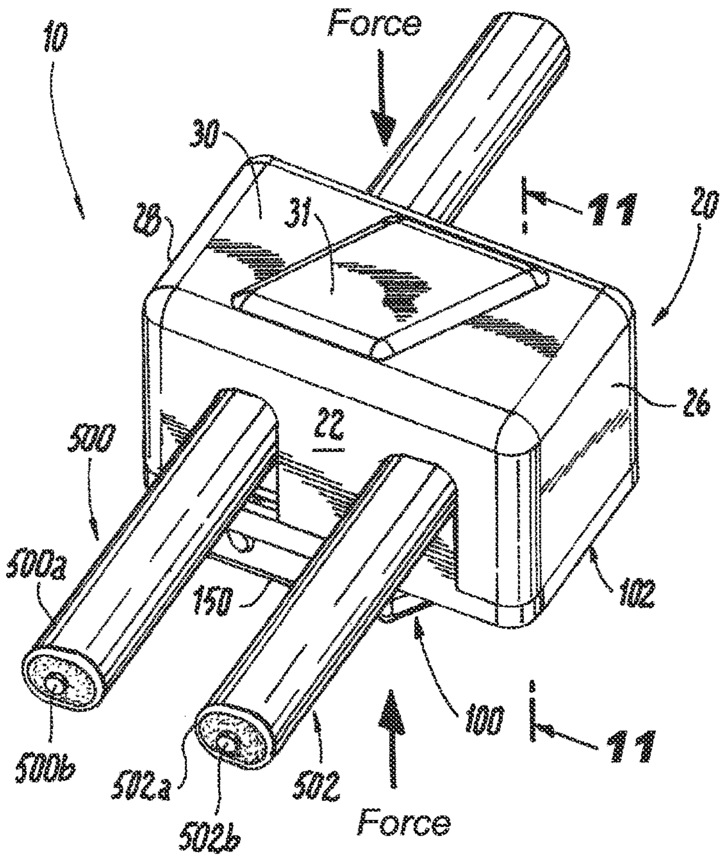
FIG. 10 is a perspective view of the of the tracer wire connector of FIG. 9 with the cover attached to the base and a through tracer wire and a dead-end tracer wire connected to the connector.
Figure 13:
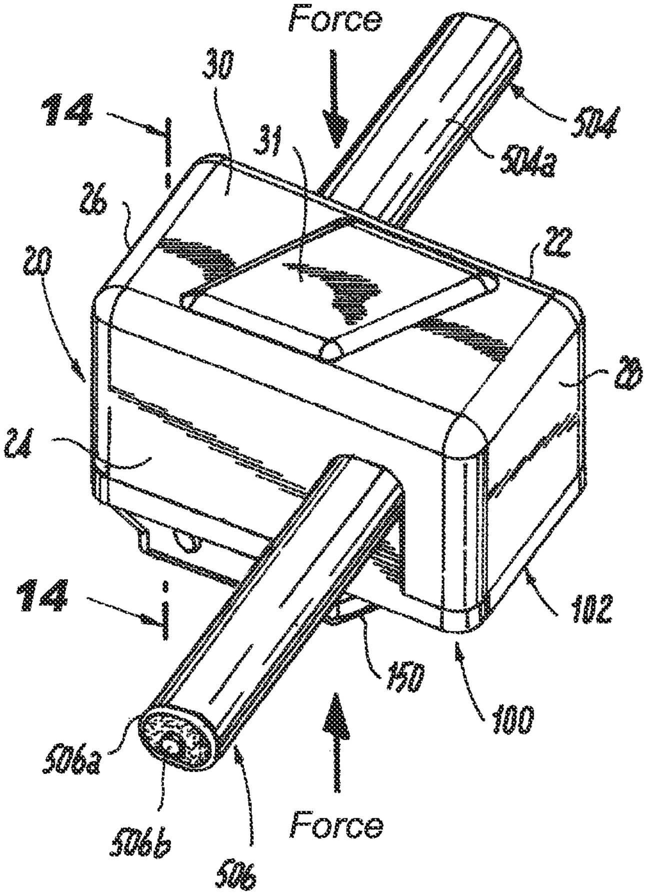
FIG. 13 is a perspective view of the of the tracer wire connector of FIG. 12 with the cover attached to the base, and two dead-end tracer wires connected to the tracer wire connector.

As noted above, the cover 20 can be oriented on the base 100 for use with a through tracer wire and a dead-end tracer wire, seen in FIG. 10, or for use with multiple dead-end tracer wires, seen in FIG. 13. To maintain a water-resistant seal between the cover 20 and the base 100 when the cover is oriented for use with multiple dead-end tracer wires, the second cradle 106 includes a plug 126, seen in FIGS. 8 and 9, that is shaped to conform to the shape of the second cradle 106, the overhang 120*a* on the side wall 120 of the strut 112 and to the shape of the overhang 140*e* on the inner wall 140*d* of the second gripper member 140. The plug 126 is positioned at one end of the cradle 106, as shown in FIG. 8, so that the outer end 126*a* of the plug 126 rests within the portal 38 in the first side wall 22 of the cover 20, seen in FIG. 9, when the cover 20 is oriented for use with multiple dead-end tracer wires, seen in FIG. 13. The plug 126 may be integral with or monolithically formed into the second cradle 106, or the plug 126 may be secured to the second cradle 106 with an adhesive or weld, e.g., a sonic weld, so that there is a water-resistant seal between the plug and the second cradle. It is noted that when the cover 20 is oriented for use with a through tracer wire and a dead-end tracer wire, the plug 126 is received within the indentation 42 in the cover 20, shown in phantom in FIG. 9.

Referring again to FIG. 8, below the platform 102 of the base 100 is a structural strengthening member 150 that reinforces the base 100 to withstand forces applied to the base by tools used to secure or attach the cover 20 to the base 100. The structural strengthening member 150 may be integral with or monolithically formed into the platform 102 to form a single structure, or the structural strengthening member 150 may be secured to the platform with adhesives or welds, e.g., sonic welds. The structural strengthening member 150 is preferably aligned with the structural strengthening member 31 on the cover 20 so that when a tool used to compress the cover against the base 100 grips both the structural strengthening member 31 and the structural strengthening member 150. The structural strengthening member 150 can have various shapes and sizes to provide the structural reinforcement to withstand forces applied to the base by tools used to attach the cover 20 to the base 100. The structural strengthening member 150 may also include one or more angled brackets 152 used to support portions of the platform 102 not in contact with the structural strengthening member 150.

The cover 20 and base 100 of the connector 10 described in the present disclosure is preferably manufactured from a non-conductive, impact resistant and water-resistant material. For example, the cover 20 and base 100 can be manufactured from a plastic material or a non-conductive composite material. Examples of such materials include injection molding plastics such as thermoplastic and thermosetting polymers, and polyvinyl chloride. A non-limiting example of a thermoplastic polymer is polycarbonate.

Referring now to FIGS. 3, 8 and 9, to attach the cover 20 to the base 100, one or more fasteners or fastening assemblies may be used. The fasteners or fastening assemblies may include various forms of mechanical fasteners and/or adhesives. Non-limiting examples of mechanical fasteners include snap-fit assemblies and nut and bolt assemblies. A non-limiting example of an adhesive includes water-resistant epoxies. In the exemplary embodiment shown, two attachment assemblies are shown. The first attachment assembly, seen in FIGS. 3 and 8, is a snap-fit assembly that includes one or more snap-beams 80 on the second end wall 28 of the cover 20 and one or more snap-recesses 132 in the outer wall 130*c* of the first gripper member 130. The second attachment assembly, seen in FIGS. 8 and 9, is a snap-fit assembly that includes one or more snap-beams 82 in the first end wall 26 of the cover 20 and one or more snap-recesses 142 in the outer wall 140*c* of the second gripper member 140. When the cover 20 is attached to the base 100, a compressive force is applied to the cover and base causing the snap-beam 80 to slide over a wall of the snap recesses 132 deflecting the side wall 28 until the snap-beam 80 enters the snap recess 132 thereby removing the force on the snap beam 80 so that the snap beam 80 enters the snap recess 132 which locks the snap beam 80 in the snap recess 132. The snap beam 82 and snap recess 142 operate in the same way.

Figure 11:
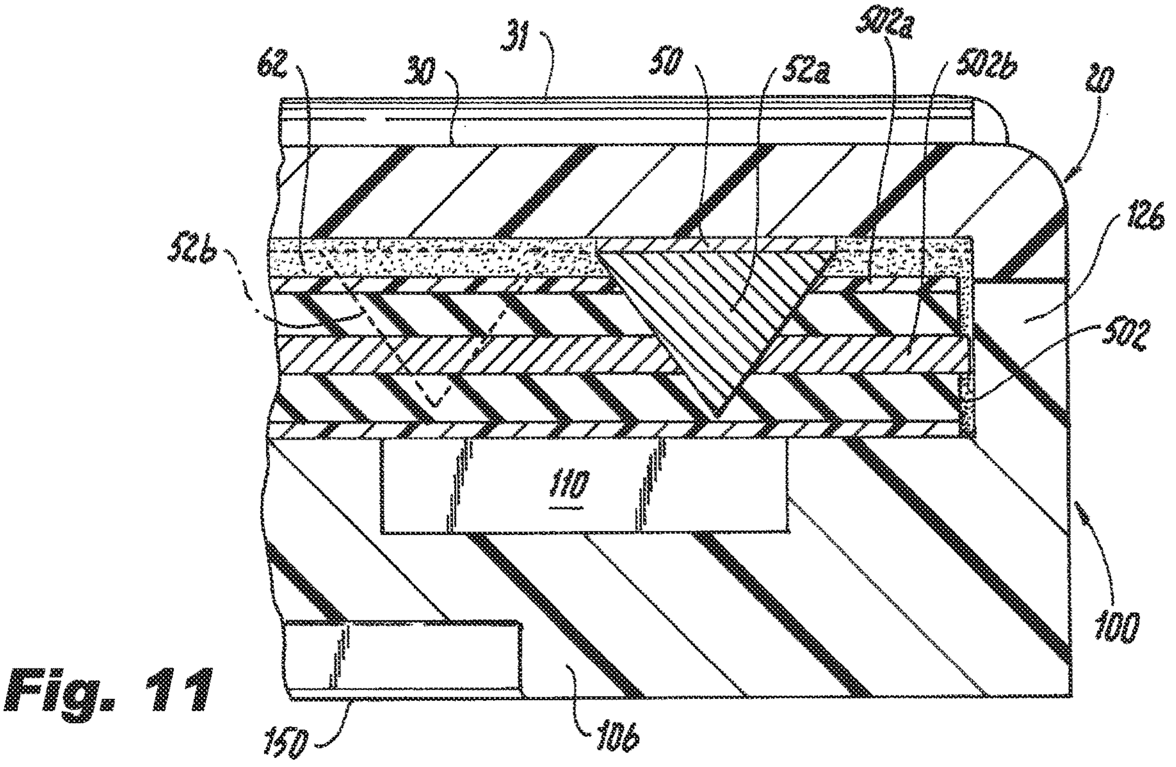
FIG. 11 is a cross-sectional view of the tracer wire connector of FIG. 10 taken from line 11-11.

Installing tracer wires into the connector 10 of the present disclosure with the cover 20 oriented for use with a through tracer wire and a dead-end tracer wire will now be described with reference to FIGS. 3, 10 and 11. Initially, the cover 20 is separated from the base 100. A through tracer wire 500 is positioned on the first cradle 104 and a dead-end tracer wire 502 is positioned on the second cradle 106. It is noted that the plug 126 on the second cradle 106 also acts as a stop for the dead-end tracer wire 502 to align the dead-end tracer wire with the insulating piercing members 52 of the plate 50. More specifically, the free end of the dead-end tracer wire is preferably positioned on the second cradle 106 so that the free end contacts the plug 126. This ensures that a conductor within the dead-end tracer wire 502 is positioned to contact the insulating piercing members 52. The cover 20 is then moved into position over the base 100 so that the alignment post 34 of the cover 20 is aligned with the aperture 114 in the strut 112 of the base 100, seen in FIG. 3. In addition, the side wall 28 of the cover 20 is positioned relative to the base 100 so that the side wall 28 is aligned with the first gripper 130. As a result, the side wall 26 of the cover 20 is positioned relative to the base 100 so that the side wall 26 is aligned with the second gripper 140, shown in phantom in FIG. 9. With the cover 20 aligned with the base 100, the cover 20 is then placed on the base 100 such that the through tracer wire 500 passes through the portals 38 and 40 in the cover 20, and the dead-end tracer wire 502 passes through the portal 36 in the cover. The jaws of a tool (not shown), e.g., channel locks, are then positioned on cover 20 and the base 100 to create sufficient compressive force to activate the snap-fit assemblies. More specifically, one jaw of a channel lock tool (not shown) is positioned on the structural strengthening member 31 on the cover 20, and the other jaw of the channel lock tool is positioned on the structural strengthening member 150 of the base 100. The tool is then compressed activating the snap-fit connection.

As the cover 20 is attached to the base 100, the insulation piercing members 52 pierce through the insulating jacket surrounding the conductor in the tracer wires 500 and 502 and contact the conductor to make an electrical connection between the conductor and the insulation piercing members 52, thus creating an electrically conductive path between the conductor and the jumper plate 50. In the exemplary embodiment of FIG. 11, the insulation piercing members 52*a* and 52*b* pierce through the insulating jacket 502*a* surrounding the conductor 502*b* in the dead-end tracer wire 502. An inner side surface of the insulation piercing member 52*a* contacts the conductor 502*b* and an outer surface of insulation piercing member 52*b* contacts the conductor 502*b* to create an electrical connection between the conductor 502*b* and the insulation piercing members 52*a* and 52*b*, thereby creating an electrically conductive path between the conductor 502*b* and the jumper plate 50. Similarly, insulation piercing members 52*c* and 52*d*, seen in FIG. 3, pierce through the insulating jacket surrounding the conductor 500*b* in the through tracer wire 500. An outer side surface of the insulation piercing member 52*d* contacts the conductor 500*b* in the through tracer wire 500 and an inner surface of insulation piercing member 52*c* contacts the conductor 500*b* to create an electrical connection between the conductor 500*b* and the insulation piercing members 52*c* and 52*d*, thereby creating an electrically conductive path between the conductor 500*b* in the through tracer wire 500 and the jumper plate 50. As a result, an electrically conductive path is established between the conductor 500*b* in the through tracer wire 500 and the conductor 502*b* in the dead-end tracer wire 502 via the jumper plate 50. In instances where the insulating material 62 or the insulating pod 66 with insulating material 68 is used, when the cover 20 is compressed against the base 100 the insulating material 62 or 68 is displaced, disbursed or otherwise spreads out to cover the junction between the insulating piercing members 52 and the insulating jacket of the tracer wires filling any spaces in such junction, as seen in FIG. 11.

Figure 12:
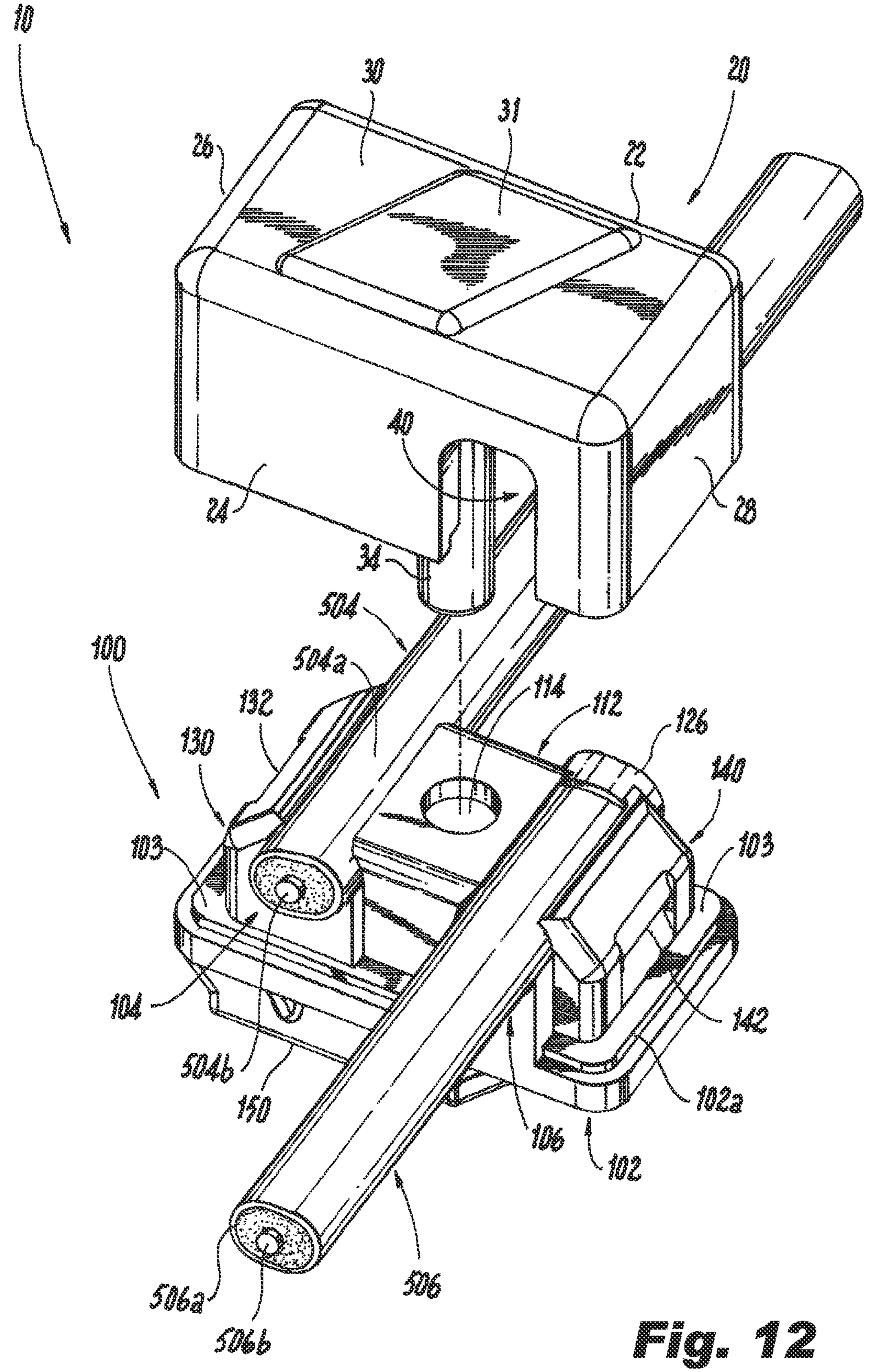
FIG. 12 is an exploded view of the connector of FIG. 2, illustrating the cover oriented for use with two dead-end tracer wires and two dead-end tracer wires resting on cradles on the base.

Installing tracer wires into the connector 10 of the present disclosure with the cover 20 oriented for use with multiple dead-end through tracer wires will now be described with reference to FIGS. 9 and 12-14. Initially, the cover 20 is separated from the base 100 and the cover is rotated approximately 180 degrees, as shown in FIG. 9. A dead-end tracer wire 504 is positioned on the first cradle 104 and a dead-end tracer wire 506 is positioned on the second cradle 106. It is noted that the plug 126 on the second cradle 106 acts as a stop for the dead-end tracer wire 506 as described above. The cover 20 is then moved into position over the base 100 so that the alignment post 34 of the cover 20 is aligned with the aperture 114 in the strut 112 of the base 100, as seen in FIG. 12. In addition, the side wall 28 of the cover 20 is positioned relative to the base 100 so that the side wall 28 is aligned with the second gripper 140. As a result, the side wall 26 of the cover 20 is positioned relative to the base 100 so that the side wall 26 is aligned with the first gripper 130. With the cover 20 aligned with the base 100, the cover 20 is then placed on the base 100 such that the dead-end tracer wire 504 passes through the portal 36 in the cover 20, seen in FIG. 9, and the dead-end tracer wire 506 passes through the portal 40 in the cover. The jaws of a tool (not shown), e.g., channel locks, are then positioned on cover 20 and the base 100 to create sufficient compressive force to activate the snap-fit assemblies as described above.

Figure 14:
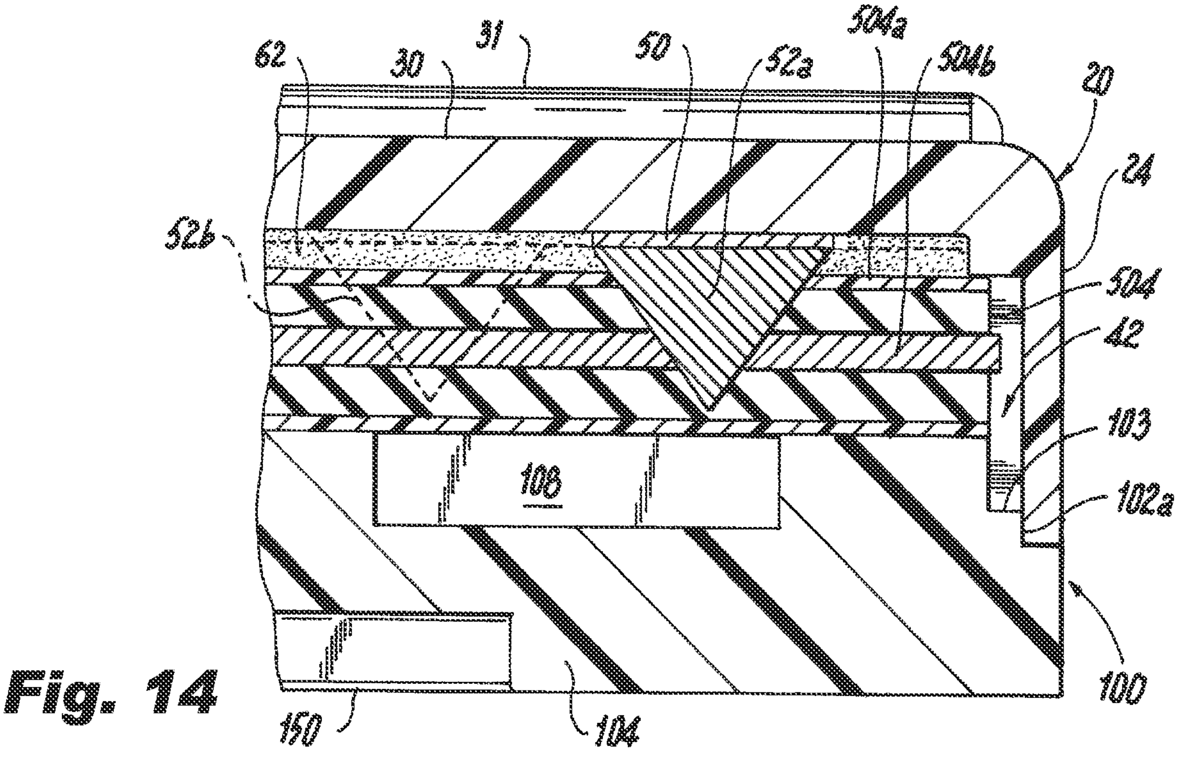
FIG. 14 is a cross-sectional view of the tracer wire connector of FIG. 13 taken from line 14-14.

As the cover 20 is attached to the base 100, the insulation piercing members 52 pierce through the insulating jacket surrounding the conductors 504*b* and 506*b* in the tracer wires 504 and 506 and contact the respective conductor to make an electrical connection between the conductors and the insulation piercing members 52, thereby creating an electrically conductive path between each conductor 504*b* and 506*b* and the jumper plate 50. In the exemplary embodiment of FIG. 14, the insulation piercing members 52*a* and 52*b* pierce through the insulating jacket 504*a* surrounding the conductor 504*b* in the dead-end tracer wire 504. An inner side surface of the insulation piercing member 52*a* contacts the conductor 504*b* and an outer surface of insulation piercing member 52*b* contacts the conductor 504*b* to create an electrical connection between the conductor 504*b* and the insulation piercing members 52*a* and 52*b*, thereby creating an electrically conductive path between the conductor 504*b* and the jumper plate 50. Similarly, insulation piercing members 52*c* and 52*d*, seen in FIG. 9, pierce through the insulating jacket 506*a* surrounding the conductor 506*b* in the dead-end tracer wire 506. An outer side surface of the insulation piercing member 52*d* contacts the conductor 506*b* and an inner surface of insulation piercing member 52*c* contacts the conductor 506*b* to create an electrical connection between the conductor 506*b* and the insulation piercing members 52*c* and 52*d*, thereby creating an electrically conductive path between the conductor 506*b* and the jumper plate 50. As a result, an electrically conductive path is established between the conductor 504*b* in the dead-end tracer wire 504 and the conductor 506*b* in the dead-end tracer wire 506 via the jumper plate 50. In instances where the insulating material 62 or the insulating pod 66 with insulating material 68 is used, when the cover 20 is compressed against the base 100 the insulating material 62 or 68 is displaced, disbursed or otherwise spreads out to cover the junction between the insulating piercing members 52 and the insulating jacket of the tracer wires filling any spaces in such junction as shown in FIG. 14.

Figure 16:
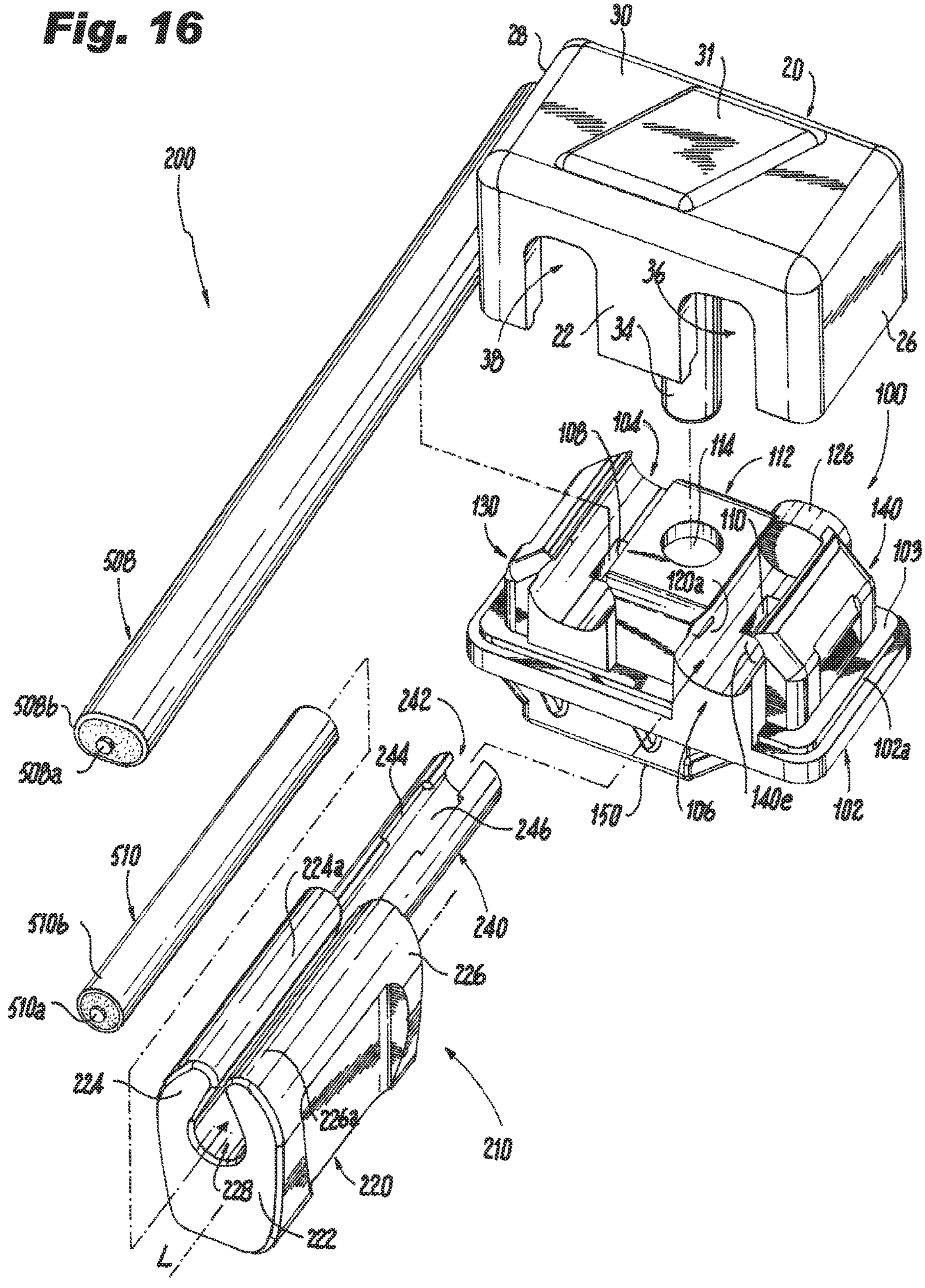
FIG. 16 is an exploded perspective view of the tracer wire connector of FIG. 15, illustrating the dead-end type adapter.

Referring now to FIGS. 15-17, another exemplary embodiment of the connector according to the present disclosure is shown. The connector 200 includes a cover 20 and a base 100, which are similar to the cover and base described above and for ease of description are not repeated. In this exemplary embodiment, the connector 200 includes a dead-end adapter 210 that permits the connector to be used with different types of tracer wires. For example, the connector 200 can be configured to be used with a Trace-Safe® tracer wire and a standard tracer wire, such as a #6-#18 AWG tracer wire. This exemplary embodiment is described with the cover 20 oriented to be used with a through tracer wire 508 and a dead-end tracer wire 510. The through tracer wire 508 in this exemplary embodiment is a Trace-Safe® tracer wire having a solid conductor 508*a* within an insulating jacket 508*b*. The dead-end tracer wire is a #12 AWG tracer wire having a solid conductor 510*a* within an insulating jacket 510*b*. The through tracer wire 508 rests on the first cradle 104 and is connected to the connector as described above. The dead-end tracer wire 510 is positioned in the adapter 210 which is then positioned on the second cradle 106, as shown in FIG. 16 and described below.

The dead-end adapter 210 includes a grip portion 220 and a connector portion 240. The grip portion 220 can be in any shape and size sufficient to permit a technician to grip the grip portion 220 and that can support the tracer wire 510 when installed underground. As shown in FIG. 16, the grip portion 220 includes a base 222, a first side wall 224, a second side wall 226 and a channel 228 that extends along a longitudinal axis "L" of the adapter 210. The first side wall 224 extends from the base 222 and has a free outer edge 224*a* extending into the channel 228. Similarly, the second side wall 226 extends from the base 222 and has a free outer edge 226*a* extending into the channel 228. In this configuration, the base 222 and side walls 224 and 226 for a U-shape like structure where the free ends 224*a* and 226*a* of the respective side walls 224 and 226 reduce the width of the channel 228 as shown. This reduced width in the channel 228 forms an overhang that holds a tracer wire, e.g., tracer wire 510, within the channel 228. The connector portion 240 of the adapter 210 is a hollow member configured and dimensioned to conform to the shape of the second cradle 106 and the overhangs 120*a* and 140*e* so that the connection portion 240 can be positioned on the second cradle 106 and aligned for subsequent connection of the conductor in the tracer wire to the insulation piercing members 52. The hollow portion of the connection portion 240 is aligned with the channel 228 and is configured to receive the tracer wire. The connection portion 240 includes a slot 242 that extends along the longitudinal axis "L" of the adapter 210 from one end of the connection portion 240 to the other end of the connection portion. The slot 242 permits the tracer wire to be inserted into the hollow portion of the connection portion 240. The connection portion 240 includes a first notch 244 on one side of the slot 242 and a second notch 246 on the other side of the slot as shown in FIG. 16. The notches 244 and 246 oppose each other to form a channel through which the insulation piercing members 52 can pass through the connection portion 240 into a tracer wire within the adapter 210.

Installing tracer wires into the connector 200 of the present disclosure with the cover 20 oriented for use with a through tracer wire and a dead-end tracer wire will now be described with reference to FIGS. 15-17. Initially, the cover 20 is separated from the base 100. A through tracer wire 508 is positioned on the first cradle 104 and a dead-end tracer wire 510 is positioned in the channel 228 of the grip portion 220 and the hollow portion of the connector portion 240 of the adapter 210. The connector portion 240 is then positioned on the second cradle 106. It is noted that the plug 126 on the second cradle 106 also acts as a stop for the connector portion 240, which aligns the connector portion with the insulation piercing members 52. The cover 20 is then moved into position over the base 100, as seen in FIG. 16, so that the alignment post 34 of the cover 20 is aligned with the aperture 114 in the strut 112 of the base 100. In addition, the side wall 28 of the cover 20 is positioned relative to the base 100 so that the side wall 28 is aligned with the first gripper 130. As a result, the side wall 26 of the cover 20 is positioned relative to the base 100 so that the side wall 26 is aligned with the second gripper 140. With the cover 20 aligned with the base 100, the cover 20 is then placed on the base 100 such that the through tracer wire 508 passes through the portals 38 and 40 in the cover, and the dead-end tracer wire 510 resting in the adapter 210 passes through the portal 36 in the cover 20. The jaws of a tool (not shown), e.g., channel locks, are then positioned on cover 20 and the base 100 to create sufficient compressive force to activate the snap-fit assemblies as described above.

As the cover 20 is attached or secured to the base 100, the insulation piercing members 52 pierce through the insulating jacket surrounding the conductors 508*a* and 510*a* in the tracer wires 508 and 510 and contact the conductor to make an electrical connection between the conductor and the insulation piercing members 52, thereby creating an electrically conductive path between the conductor and the jumper plate 50. In the exemplary embodiment of FIG. 17, the insulation piercing members 52*a* and 52*b* pierce through the insulating jacket 510*b* surrounding the conductor 510*a* in the dead-end tracer wire 510. An inner side surface of the insulation piercing member 52*a* contacts the conductor 510*a* and an outer surface of insulation piercing member 52*b* contacts the conductor 510*a* to create an electrical connection between the conductor 510*a* and the insulation piercing members 52*a* and 52*b*, thereby creating an electrically conductive path between the conductor 510*a* and the jumper plate 50. Similarly, insulation piercing members 52*c* and 52*d*, seen in FIG. 3, pierce through the insulating jacket 508*b* surrounding the conductor 508*a* in the through tracer wire 508. An outer side surface of the insulation piercing member 52*d* contacts the conductor 508*a* and an inner surface of insulation piercing member 52*c* contacts the conductor 508*a* to create an electrical connection between the conductor 508*a* and the insulation piercing members 52*c* and 52*d*, thereby creating an electrically conductive path between the conductor 508*a* and the jumper plate 50. As a result, an electrically conductive path is established between the conductor 508*a* in the through tracer wire 508 and the conductor 510*a* in the dead-end tracer wire 510 via the jumper plate 50. In instances where the insulating material 62 or the insulating pod 66 with insulating material 68 is used, when the cover 20 is compressed against the base 100 the insulating material 62 or 68 is displaced, disbursed or otherwise spreads out to cover the junction between the insulating piercing members 52 and the insulating jacket of the tracer wires filling any spaces in such junction, as shown in FIG. 17.

Figure 18:
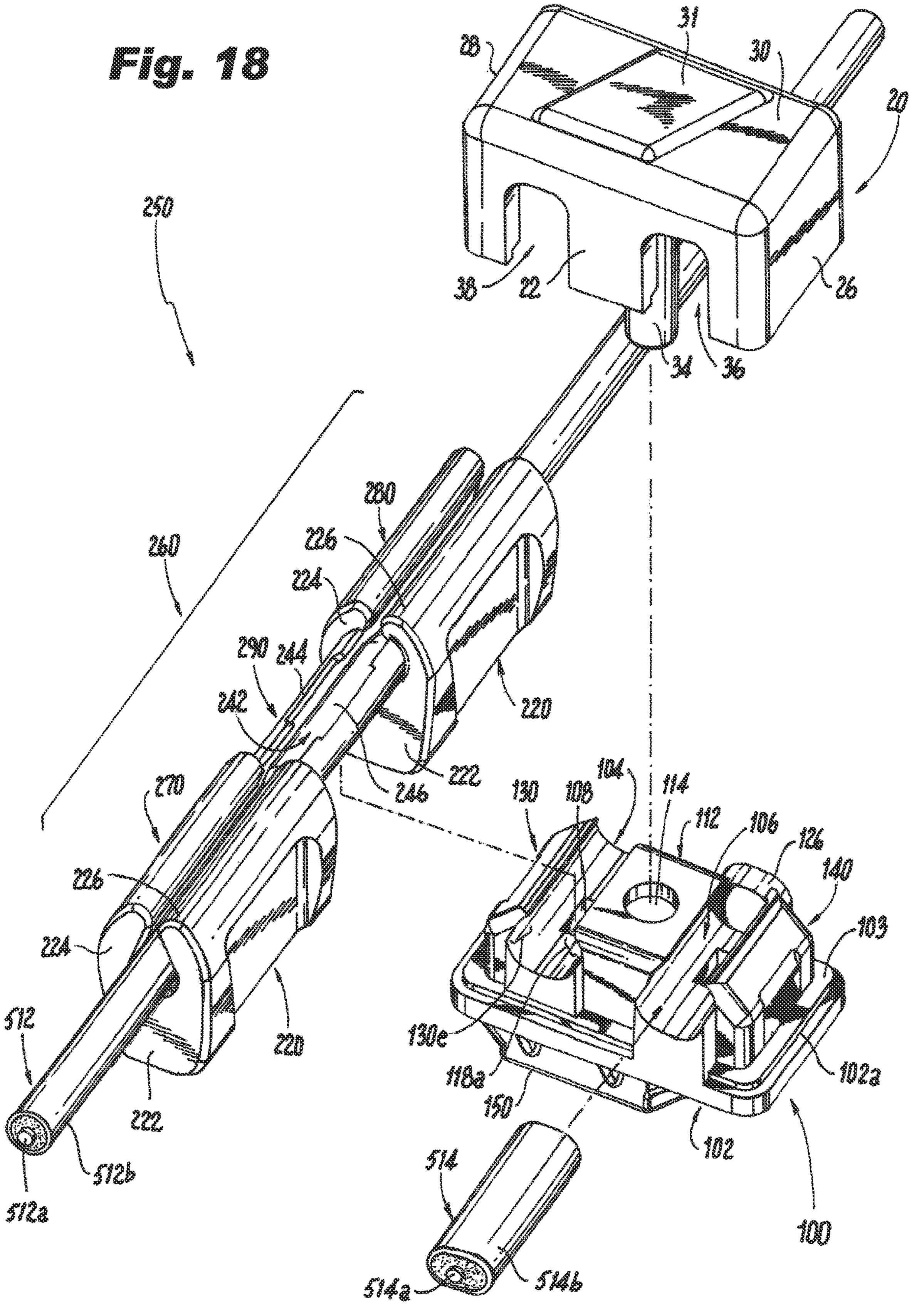
FIG. 18 is an exploded perspective view of another exemplary embodiment of a tracer wire connector according to the present disclosure, illustrating a cover, a base and a through type adapter, where the cover is oriented for use with a through tracer wire and a dead-end tracer wire, and where the through type adapter is positioned to rest on and straddle one of the cradles on the base and extend from both sides of the cover.
Figure 19:
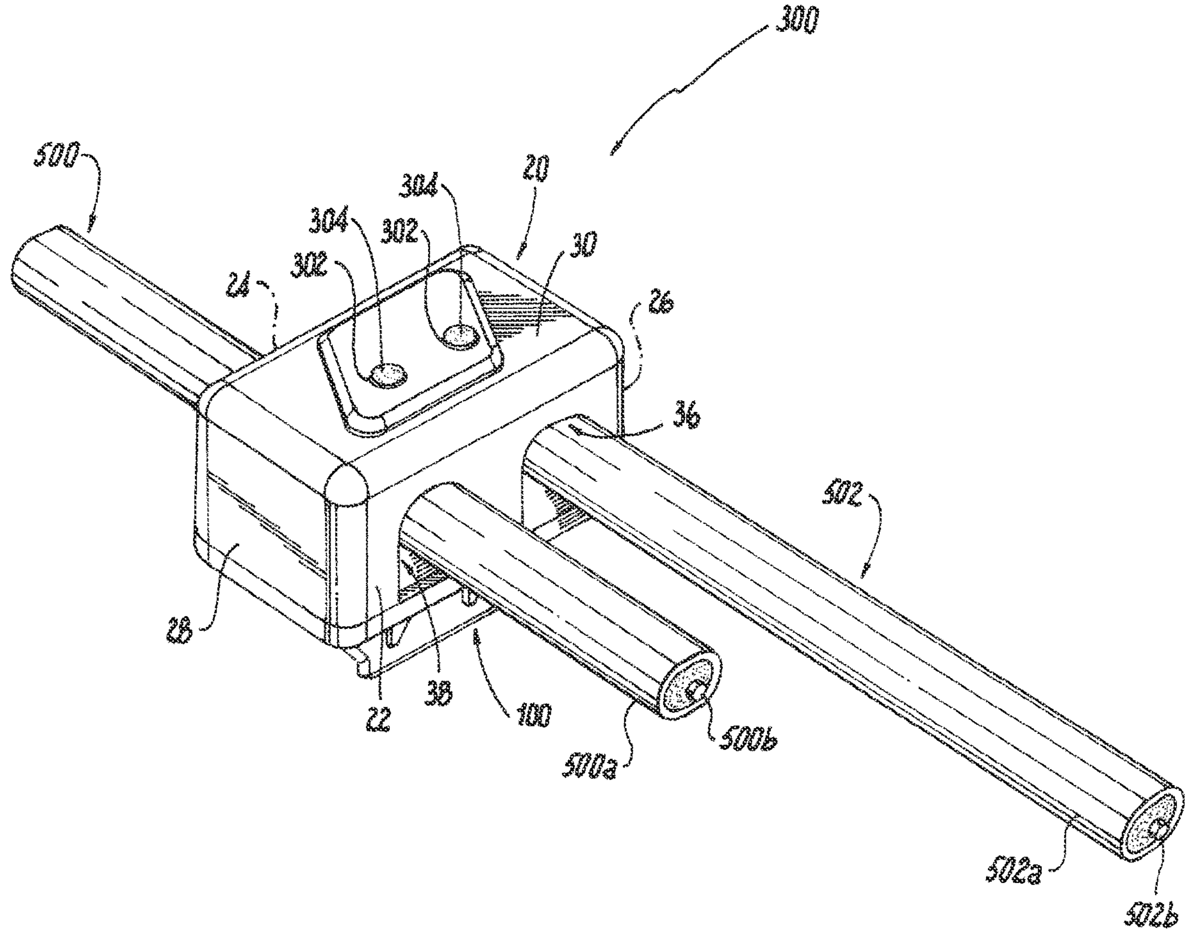
FIG. 19 is a perspective view of another exemplary embodiment of a tracer wire connector according to the present disclosure, illustrating multiple test ports in a cover of the tracer wire connector, plugs sealing the test ports, a through tracer wire connected to the tracer wire connector and a dead end tracer wire connected to the tracer wire connector.

Referring now to FIG. 18, another exemplary embodiment of the connector according to the present disclosure is shown. The connector 250 includes a cover 20 and a base 100, which are similar to the cover and base described above and for ease of description are not repeated. In this exemplary embodiment, the connector 250 includes a through type adapter 260 that permits the connector to be used with different types of through trace wires. For example, the connector 250 can be configured to be used with a Trace-Safe® tracer wire and a standard trace wire, such as a #6-#18 AWG trace wire. This exemplary embodiment is described with the cover 20 oriented to be used with a through tracer wire 512 and a dead-end tracer wire 514. The through tracer wire 512 in this exemplary embodiment is a #12 AWG tracer wire having a solid conductor 512*a* within an insulating jacket 512*b* surrounding the conductor 512*a*. The dead-end tracer wire 514 is a Trace-Safe® tracer wire having a solid conductor 514*a* within an insulating jacket 514*b* surrounding the conductor 514*a*. The through tracer wire 512 is positioned in the adapter 260 which is then positioned on the first cradle 104 as shown in FIG. 18 and described below. The dead-end tracer wire 514 rests on the first cradle 104 and is connected to the connector 250 as described above.

The through type adapter 260 includes a first grip portion 270, a second grip portion 280 and a connector portion 290 between the between the first grip portion and the second grip portion. The first grip portion 270 and the second grip portion 280 are the same as the grip portion 220 described above so that the reference numerals used for the first grip portion 270 and the second grip portion 280 are the same as the reference numerals used for the grip member 220. As such, a description of the grip portions is not repeated. The connector portion 290 is the same as the connector portion 240 described above so that the reference numerals used for the connector portion 290 are the same as the reference numerals used for the connector portion 240. As such a description of the connector portion is not repeated.

Installing tracer wires 512 and 514 into the connector 250 of the present disclosure with the cover 20 oriented for use with a through tracer wire and a dead-end tracer wire will now be described with reference to FIG. 18. Initially, the cover 20 is separated from the base 100. A dead-end tracer wire 514 is positioned on the second cradle 106. It is noted that the plug 126 on the second cradle 106 acts as a stop for the dead-end tracer wire 514, which aligns the dead-end tracer wire with the insulation piercing members 52. A through tracer wire 512 is positioned in the channel 228, seen in FIG. 16, of the grip portion 270, in the hollow portion of the connector portion 290 and the channel 228 of the grip portion 280. The connector portion 290 of the through type adapter 260 is then positioned on the first cradle 104. The cover 20 is then moved into position over the base 100 so that the alignment post 34 of the cover 20 is aligned with the aperture 114 in the strut 112 of the base 100. In addition, the side wall 28 of the cover 20 is positioned relative to the base 100 so that the side wall 28 is aligned with the first gripper 130. As a result, the side wall 26 of the cover 20 is positioned relative to the base 100 so that the side wall 26 is aligned with the second gripper 140. With the cover 20 aligned with the base 100, the cover 20 is then placed on the base 100 such that the through tracer wire 512 resting in the adapter 260 passes through the portals 38 and 40 in the cover, and the dead-end tracer wire 514 resting in the second cradle 106 passes through the portal 36 in the cover 20. The jaws of a tool (not shown), e.g., channel locks, are then positioned on cover 20 and the base 100 to create sufficient compressive force to activate the snap-fit assemblies as described above. As the cover 20 is attached to the base 100, the insulation piercing members 52 pierce through the insulation surrounding the conductor 512*a* or 514*a* in the respective tracer wire 512 or 514 and contact the conductors 512*a* and 514*a* to make an electrical connection between the conductors and the respective insulation piercing members 52, thus creating an electrically conductive path between the conductors 512*a* and 514*a* and the jumper plate 50 as described above. In instances where the insulating material 62 or the insulating pod 66 with insulating material 68 is used, when the cover 20 is compressed against the base 100 the insulating material 62 or 68 is displaced, disbursed or otherwise spreads out to cover the junctions between the insulating piercing members 52 and the insulating jacket surrounding the respective tracer wires 512 and 514 filling any spaces in such junctions.

Referring now to FIGS. 19-22, another exemplary embodiment of a connector according to the present disclosure is shown. In this exemplary embodiment, the connector 300 includes a cover 20 attached to a base 100. The cover 20 can be attached to the base 100 using for example, fasteners or fastening assemblies. An example of a suitable fastening assembly includes mechanical fastening assemblies. Non-limiting examples of mechanical fastening assemblies include cantilever snap-fit assemblies that include a snap-beam and a snap-recess, annular snap-fit assemblies, torsional snap-fit assemblies, and a nut and bolt assembly. However, one skilled in the art would readily appreciate other fastener assemblies could be used to attach the cover 20 to the base 100. Further, one skilled in the art would readily appreciate that fasteners, such as adhesives, mechanical fasteners and/or welds, may be used to attach the cover 20 to the base 100.

Figure 21:
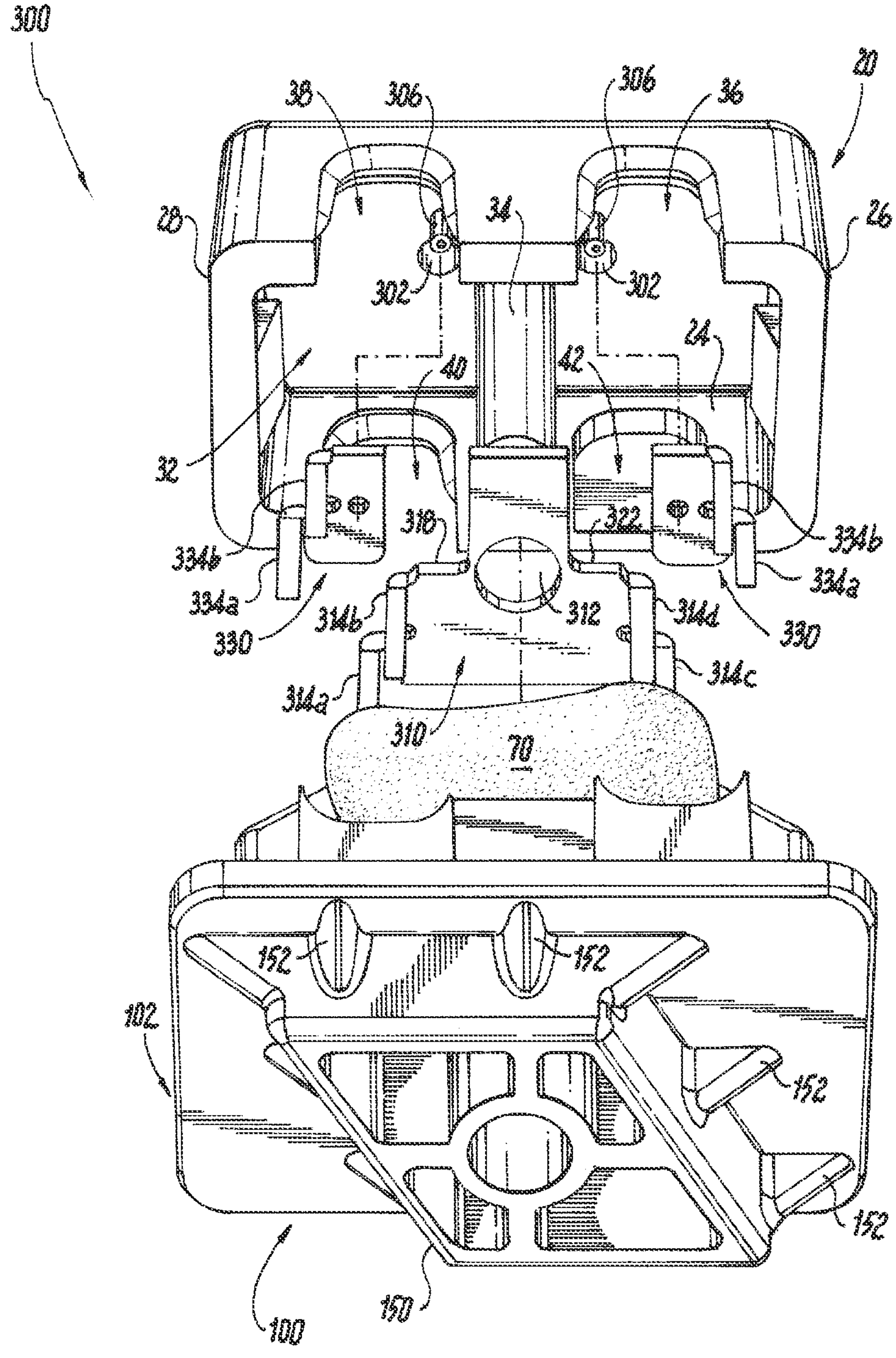
FIG. 21 is a bottom perspective view of the tracer wire connector of FIG. 19 without the tracer wires, illustrating the test plates separated from the jumper plate.

Any of the embodiments of the cover 20 described above can be included in this exemplary embodiment of the connector 300. The base 100 is the same as the base described above. As such a full description of the cover 20 and the base 100 is not repeated. In this exemplary embodiment of the connector 300, the cover 20 includes one or more test ports 302 that extend through the top wall 30 of the cover 20. In this exemplary embodiment, there are two test ports 302 in the top wall 30 of the cover 20. The test ports 302 are configured and dimensioned to permit a contact 350 of a continuity tester 340, seen in FIG. 22, to pass through the cover 20 and enter the cavity 32 in the interior of the cover 20, as seen in FIG. 21. For example, the contact 350 may have a diameter of about 1.588 mm. In the exemplary embodiment shown, the test ports 302 are holes having a diameter ranging from about 0.397 mm to about 2.54 mm. To seal the test ports 302 to limit and possibly prevent moisture from seeping into the cavity 32 in the cover 20, a sealing member 304 may be inserted into the test portal 302. The sealing member 304 may be, for example, a cylindrical plug made of a weatherproof material, or the sealing member 304 may be a weatherproof sealing gel. As non-limiting examples, the sealing member 304 may be made of neoprene, silicone rubber or a silicone-based gel.

The jumper plate 310 in this exemplary embodiment differs from the jumper plate 50 described above. In this exemplary embodiment, the jumper plate 310 is an electrically conductive jumper plate secured to an interior or underside surface of the top wall 30, as shown in FIG. 21. For ease of description, the electrically conductive jumper plate 310 may also be referred to herein as the "jumper plate." The jumper plate 310 includes an aperture 312 to permit the jumper plate to fit over the alignment post 34 extending from the top surface 30 of the cover 20. The jumper plate 310 includes one or more insulation piercing members 314 extending from the jumper plate. The insulating piercing members 314 act as electrical contacts and are substantially the same as the insulating piercing members 52 described above. For ease of description the insulation piercing members 314 may be identified in the figures with alphanumeric characters such as 314*a*, 314*b*, 314*c*, and 314*d*, to identify different insulation piercing members 314. In the embodiment shown, the jumper plate 310 includes two pairs of insulation piercing members 314, where the first pair 316 of insulation piercing members 314*a* and 314*b* are on a first side 318 of the jumper plate 310, and the second pair 320 of insulation piercing members 314*c* and 314*d* are on a second side 322 of the jumper plate. The first pair 316 of insulation piercing members 314*a* and 314*b* extend from the first side 318 of the jumper plate 310 so that there is a gap "G," seen in FIG. 4, between an inner surface of the insulation piercing member 314*a* and an outer surface of the insulation piercing member 314*b*. The gap "G" is configured to receive the electrical conductor, e.g., conductor 500*b* or conductor 502*b*, in the tracer wire, e.g., tracer wire 500 or 502, so that the outer periphery of the electrical conductor contacts the inner surface of the insulation piercing member 314*a* and the outer surface of the insulation piercing member 314*b*. For example, if the electrical conductor in the tracer wire is a #10 AWG conductor, the gap "G" would be about the approximate outer diameter of #10 AWG conductors. Similarly, the second pair 320 of insulation piercing members 314*c* and 314*d* extend from the second side 322 of the jumper plate 310 so that there is a gap "G," seen in FIG. 4, between an inner surface of the insulation piercing member 314*c* and an outer surface of the insulation piercing member 314*d*. The gap "G" is configured to receive an electrical conductor, e.g., conductor 500*b* or 502*b*, in a tracer wire, e.g., 500 or 502, so that the outer periphery of the electrical conductor contacts the inner surface of the insulation piercing member 314*c* and the outer surface of the insulation piercing member 314*d*. In the exemplary embodiment shown, the insulation piercing members 314 extend substantially perpendicular from the jumper plate 310. However, the insulation piercing members 314 may extend from the jumper plate 310 so that they are at an acute or obtuse angle relative to the jumper plate 310.

Continuing to refer to FIG. 19-22, the insulation piercing members 314 may come in different shapes and sizes configured and dimensioned to pierce or cut through one or more insulating jackets surrounding an electrical conductor within the tracer wire. For example, in the embodiment shown in FIGS. 20 and 20*a*, the insulation piercing members 314 are triangular shaped members, e.g., teeth, with flat side surfaces having a sufficient surface area so that the electrical conductor in the tracer wire contacts the flat side surface of the insulation piercing members. Other examples of the shape of the insulation piercing members 314 include, cone-shaped insulation piercing members, cylindrical insulation piercing members with a pointed tip, or flat plates with a serrated edge to pierce through the insulation jacket surrounding the electrical conductor in the tracer wire.

The insulation piercing members 314 according to the present disclosure are preferably made of an electrically conductive material that is sufficiently rigid to pierce through one or more insulation jackets surrounding an electrical conductor within the tracer wires. Non-limiting examples of such materials include hardened copper, hardened aluminium, stainless steel or hardened brass. Preferably, the jumper plate 310 and insulating piercing members 314 are made of the same material. In another exemplary embodiment, the jumper plate 310 and insulating piercing members 314 can be made of an electrically conductive material where the insulation piercing members 314 are hardened using conventional hardening processes, such as heating and rapidly cooling the insulating piercing members 314. Non-limiting examples of the electrically conductive materials include brass and copper.

Figure 20:
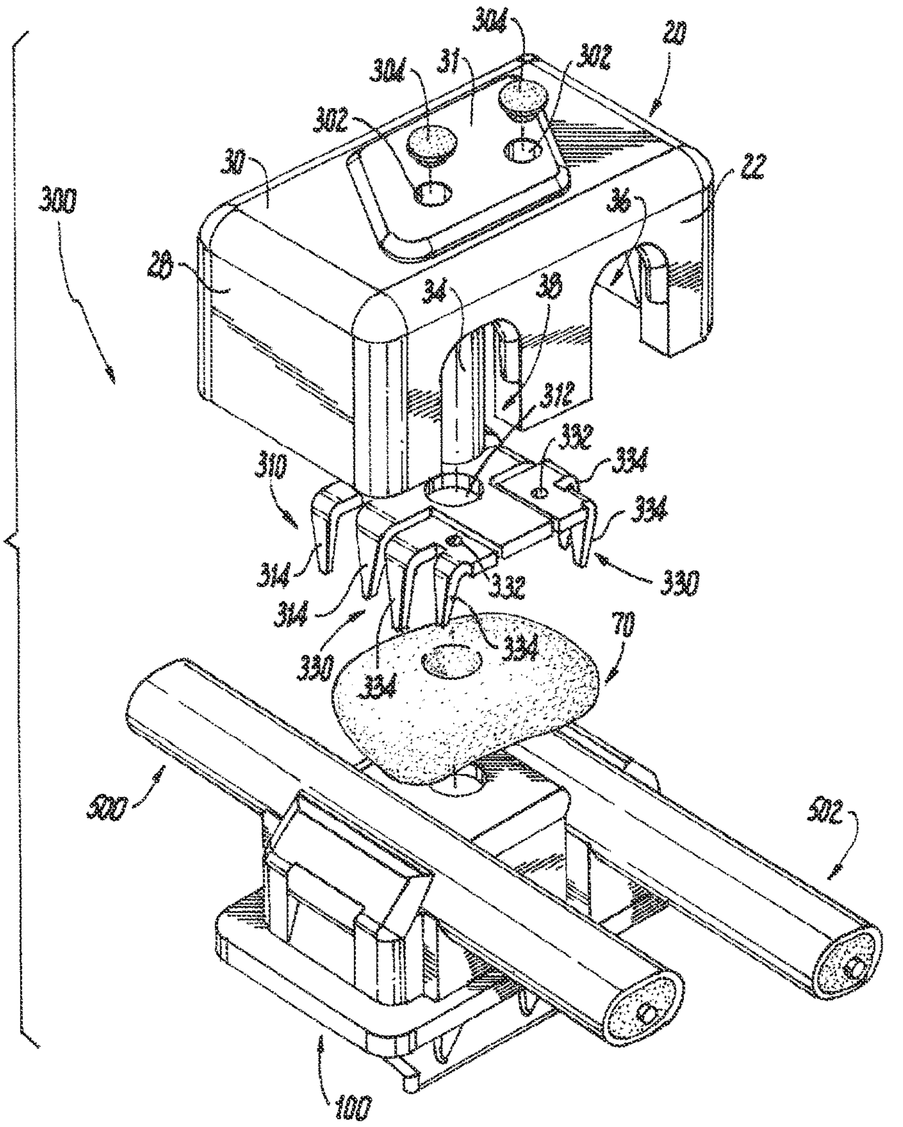
FIG. 20 is an exploded perspective view of the tracer wire connector of FIG. 19, illustrating the multiple test ports in the cover, a jumper plate for creating an electrically conductive path between the tracer wires and test plates used to test continuity between the tracer wires.
Figure 20A:
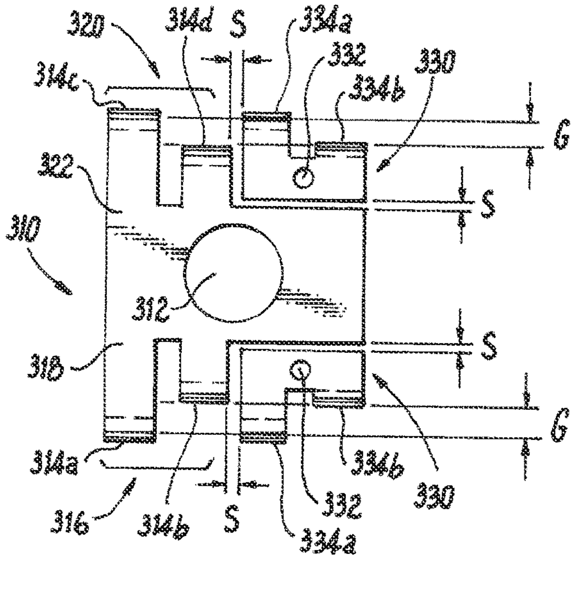
FIG. 20*a* is a top plan view of another exemplary embodiment of a jumper plate and an exemplary embodiment of test plates incorporated into the tracer wire connector of FIG. 19.

The exemplary embodiment of FIGS. 20, 20*a* and 21, the connector 300 also includes one or more test plates 330. The test plates 330 are used for performing a continuity check to verify that the jumper plate 310 is electrically connected to each conductor, e.g., conductors 500*b* and 502*b*, in each tracer wire, e.g., tracer wires 500 and 502, attached to the connector 300. In the exemplary embodiment shown, there are two test plates 330. The test plates 330 are positioned adjacent the jumper plate 310 but separated from the jumper plate so that the test plates 330 are not in electrical contact with the jumper plate 330. The spacing "S" between the test plate 330 and the jumper plate 310 is sufficient to electrically isolate the test plate 330 from the jumper plate 310. Each test plate 330 is also aligned with a test port 302 in the cover 20 so that a contact of a continuity tester can pass through the test port 302 and contact the test plate 330. Each test plate 330 is an electrically conductive plate that includes a mounting aperture 332 that is configured and dimensioned to receive a mounting post 306 extending from an interior or underside surface of the top wall 30 of the cover 20, seen in FIG. 21. The mounting aperture 332 and mounting post 306 align the test plate 330 with the jumper plate 310 so that test plate 330 maintains the spacing "S" from the jumper plate 310, and aligned the test plate 330 with the test port 302.

Each test plate 330 includes one or more insulation piercing members 334 extending from the test plate. The insulating piercing members 334 act as electrical contacts and are substantially the same as the insulating piercing members 314 and 52 described above. For ease of description the insulation piercing members 334 may be identified in the figures with alphanumeric characters such as 334*a*, 334*b*, 334*c*, and 334*d*, to identify different insulation piercing members 334. In the embodiment shown, each test plate 330 includes a pair of insulation piercing members 334, that are identified as insulation piercing members 334*a* and 334*b*. The pair of insulation piercing members 334*a* and 334*b* extend from the test plate 330 so that there is a gap "G," seen in FIG. 20*a*, between an inner surface of the insulation piercing member 334*a* and an outer surface of the insulation piercing member 334*b*. The gap "G" is configured to receive the electrical conductor, e.g., conductor 500*b* or conductor 502*b*, in the tracer wire, e.g., tracer wire 500 or 502, so that the outer periphery of the electrical conductor contacts the inner surface of the insulation piercing member 334*a* and the outer surface of the insulation piercing member 334*b*. For example, if the electrical conductor in the tracer wire is a #10 AWG conductor, the gap "G" would be about the approximate outer diameter of #10 AWG conductors. In the exemplary embodiment shown, the insulation piercing members 334 extend substantially perpendicular from the test plate 330. However, the insulation piercing members 334 may extend from the test plate 330 so that they are at an acute or obtuse angle relative to the test plate 330. As shown in FIG. 20*a*, the gap "G" between the insulation piercing members 334 is the same as the gap "G" between the insulation piercing members 314 so that when the test plates 330 are positioned adjacent the jumper plate 310 the gaps "G" are in longitudinal alignment so that the insulation piercing members 334 and the insulation piercing members 314 can contact the conductor in the tracer wire.

Continuing to refer to FIGS. 20, 20*a* and 21, the insulation piercing members 334 on the test plates 330 may come in different shapes and sizes configured and dimensioned to pierce or cut through one or more insulating jackets surrounding an electrical conductor within the tracer wire. For example, in the embodiment shown, the insulation piercing members 334 are triangular shaped members, e.g., teeth, with flat side surfaces having a sufficient surface area so that the electrical conductor in the tracer wire contacts the flat side surface of the insulation piercing members. Other examples of the shape of the insulation piercing members 334 include, cone-shaped insulation piercing members, cylindrical insulation piercing members with a pointed tip, or flat plates with a serrated edge to pierce through the insulation jacket surrounding the electrical conductor in the tracer wire.

The insulation piercing members 334 according to the present disclosure are preferably made of an electrically conductive material that is sufficiently rigid to pierce through one or more insulation jackets surrounding an electrical conductor within the tracer wires. Non-limiting examples of such materials include hardened copper, hardened aluminium, stainless steel or hardened brass. Preferably, the test plate 330 and insulating piercing members 334 are made of the same material. In another exemplary embodiment, the test plate 330 and insulating piercing members 334 can be made of an electrically conductive material where the insulation piercing members 334 are hardened using conventional hardening processes, such as heating and rapidly cooling the insulating piercing members 334. Non-limiting examples of the electrically conductive materials include brass and copper.

Figure 22:
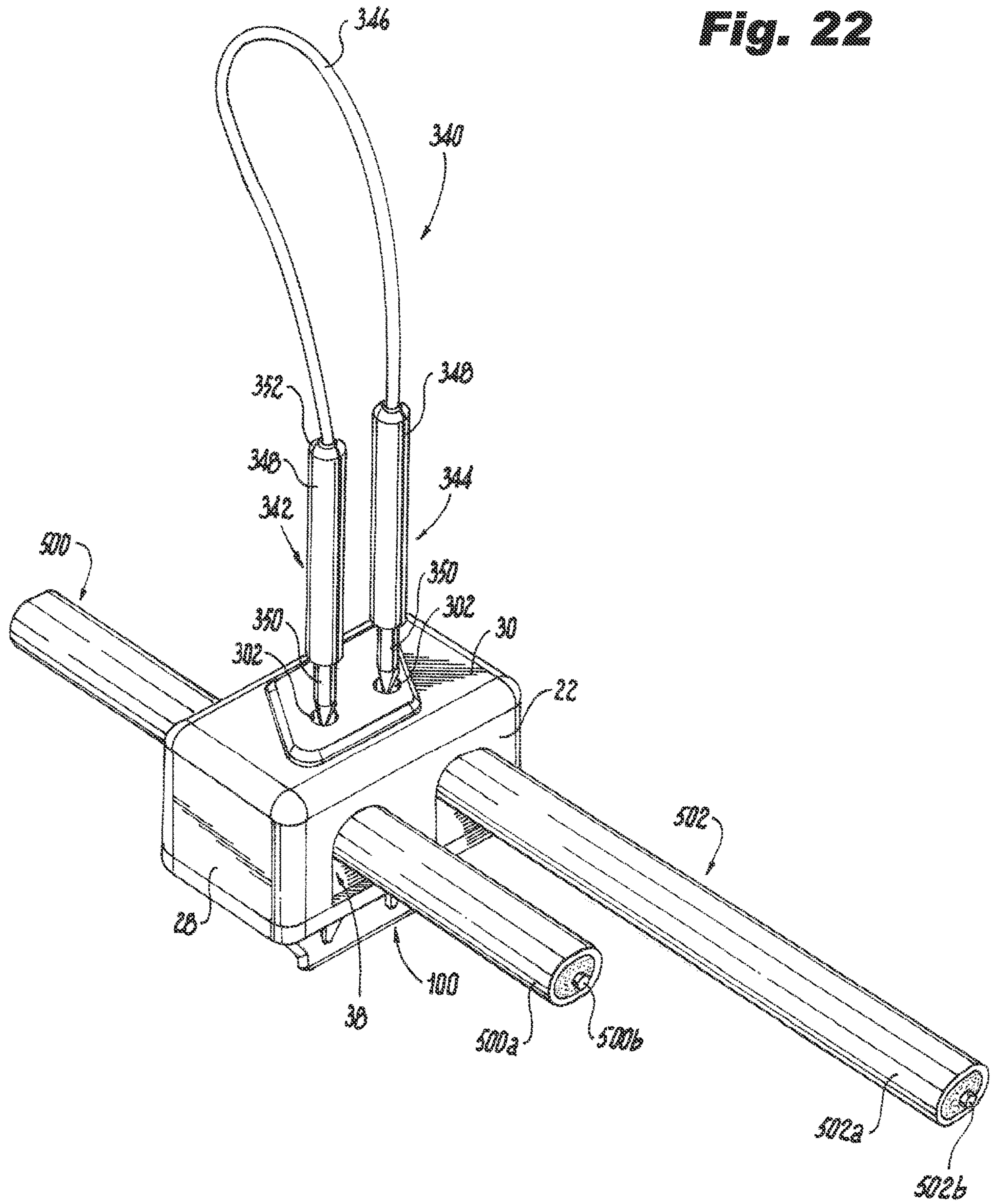
FIG. 22 is a perspective view of the tracer wire connector of FIG. 19, illustrating continuity tester probes inserted into the test ports in the cover of the tracer wire connector used when testing continuity between the tracer wires.

To perform a continuity test to verify continuity between the conductors of two trace wires connected to the connector 300, a continuity tester 340, such as the continuity tester shown in FIG. 22 can be used. The continuity tester 340 includes two probes 342 and 344 interconnected by an electrical wire 346. Each probe 342 and 344 includes gripping portion 348 and a narrow diameter contact 350 extending from one end of each gripping portion 348. The contacts 350 have an outer diameter that is sufficient to permit the contact 350 to pass through the test port 302, and a length sufficient to contact the test plate 330 that is aligned with the test port 302. Either the gripping portion 348 of probe 342 or the gripping portion 348 of probe 344 includes an internal battery (not shown) and an indicating device 352 attached to the gripping portion 348. The indicating device 352 may be, for example, an illuminating device that provides a visual indication of continuity, or an audio device that provides an audio indication of continuity. A non-limiting example an illuminating device is a LED. A non-limiting example of an audio device is a buzzer. The indicating device 352 is operatively connected to the battery (not shown) and the wire 346 connected between the probes 342 and 344. To perform a continuity test, the contacts 350 of the probes 342 and 344 are inserted through separate test ports 302 in the cover 20. If the sealing member 304 in the test ports 302 is a plug, the plug would typically be removed prior to inserting the contacts 350 into the test ports 302. If the sealing member 304 in the test ports 302 is a sealing gel, the contacts 350 would typically be inserted through the sealing gel and through the test ports 302 until the contacts 350 contact the test plates 330. If there is continuity between the conductors 500*b* and 502*b* in the trace wires 500 and 502, the indicating device 352 would activate. If the indicating device 352 is an illuminating device, the illuminating device would illuminate. If the indicating device 352 is an audio device, the audio device would emit an audible sound.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A connector for electrically interconnecting multiple tracer wires, the connector comprising:

a connector base having a first cradle and a second cradle; and a cover attachable to the base, the cover having an internal cavity, a plurality of portals on a first side wall of the cover and a portal on a second side wall of the cover;

wherein when the cover is attached to the base in a first position, a first of the plurality of portals on the first side wall aligns with the first cradle and the portal on the second side wall aligns with the first cradle creating a passage through the cover, and a second of the plurality of portals on the first side wall aligns with the second cradle creating a passage into the cover and the second side wall aligns with the second cradle blocking access to the internal cavity of the cover;

wherein when the cover is attached to the base in a second position, the first of the plurality of portals on the first side wall aligns with the second cradle creating a passage into the cover and the portal on the second side wall aligns with the second cradle and a plug positioned in the second cradle blocks access to the internal cavity through the portal on the second side wall, and the second of the plurality of portals on the first side wall aligns with the first cradle creating a passage into the cover and the second side wall aligns with the first cradle blocking access to the internal cavity of the cover; and at least two insulation piercing members positioned within the internal cavity of the cover, the at least two insulation piercing members being electrically conductive and electrically coupled, wherein a first of the at least two insulation piercing members being aligned with the first cradle when the cover is attached to the base, and wherein a second of the at least two insulation piercing members being aligned with the second cradle when the cover is attached to the base.

2. The connector according to claim 1, wherein the at least two insulation piercing members are at least partially embedded within an insulating material.

3. The connector according to claim 2, wherein the insulating material is a displaceable material.

4. The connector according to claim 1, wherein the at least two insulation piercing members are electrically coupled by an electrically conductive plate.

5. The connector according to claim 4, wherein the electrically conductive plate is at least partially embedded within an insulating material.

6. The connector according to claim 1, wherein each of the at least two insulation piercing members comprise a pointed tooth.

7. The connector according to claim 1, wherein the at least two insulation piercing members comprises at least two pairs of insulation piercing members.

8. The connector according to claim 1, wherein the base includes an alignment aperture and the cover includes an alignment post extending from an interior of the cover such that when the cover is attached to the base the alignment post passes through the alignment aperture.

9. The connector according to claim 1, wherein the cover includes a plurality of test ports therethrough, and wherein one of the plurality of test ports is aligned with one of a plurality of test plates located within the internal cavity of the cover.

10. The connector according to claim 9, wherein each of the plurality of test plates includes at least two insulation piercing members extending from the test plate.

11. A connector for electrically interconnecting multiple tracer wires, the connector comprising:

a connector base having a first cradle and a second cradle; and a cover attachable to the base, the cover having an internal cavity that receives the first cradle and the second cradle when the cover is attached to the base, first and second portals on a first side wall of the cover and a third portal on a second side wall of the cover;

wherein when the cover is attached to the base in a first position the first portal aligns with the first cradle and the third portal aligns with the first cradle creating a passage through the cover, and the second portal aligns with the second cradle creating a passage into the cover and the second side wall aligns with the second cradle blocking access into the internal cavity of the cover;

wherein when the cover is attached to the base in a second position, the first portal aligns with the second cradle and a plug positioned in the second cradle blocks access to the internal cavity through the first portal and the third portal aligns with the second cradle creating a passage into the cover, and the second portal aligns with the first cradle creating a passage into the cover and the second side wall aligns with the first cradle blocking access into the internal cavity of the cover; and at least two insulation piercing members positioned within the internal cavity, the at least two insulation piercing members being electrically conductive and electrically coupled, wherein a first of the at least two insulation piercing members is aligned with the first cradle when the cover is attached to the base, and wherein a second of the at least two insulation piercing members is aligned with the second cradle when the cover is attached to the base.

12. The connector according to claim 11, wherein the at least two insulation piercing members are embedded at least partially within an insulating material.

13. The connector according to claim 11, wherein the at least two insulation piercing members are electrically coupled by an electrically conductive plate.

14. The connector according to claim 13, wherein the electrically conductive plate is at least partially embedded within an insulating material.

15. The connector according to claim 11, wherein each of the at least two insulation piercing members comprise a pointed tooth.

16. The connector according to claim 11, wherein the at least two insulation piercing members comprises at least two pairs of insulation piercing members.

17. The connector according to claim 11, wherein the base includes an alignment aperture and the cover includes an alignment post extending from an interior of the cover such that when the cover is attached to the base the alignment post passes through the alignment aperture.

18. The connector according to claim 11, wherein the cover includes a plurality of test ports therethrough, and wherein one of the plurality of test ports is aligned with one of a plurality of test plates located within the internal cavity of the cover.

19. The connector according to claim 18, wherein each of the plurality of test plates includes at least two insulation piercing members extending from the test plate.

20. A connector for electrically interconnecting multiple tracer wires, the connector comprising:

a connector base having a first cradle and a second cradle; and a cover attachable to the base, the cover having an internal cavity, a plurality of portals on a first side wall of the cover providing access into the cover and a portal on a second side wall of the cover providing access into the cover;

wherein when the cover is attached to the base in a first position, a first of the plurality of portals on the first side wall aligns with a first end of the first cradle providing access through the cover to the first cradle and the portal on the second side wall aligns with a second end of the first cradle providing access through the cover to the first cradle, and a second of the plurality of portals on the first side wall aligns with a first end of the second cradle providing access through the cover to the second cradle and the second side wall aligns with a second end of the second cradle blocking access to the second cradle;

wherein when the cover is attached to the base in a second position, the first of the plurality of portals on the first side wall aligns with the second end of the second cradle and a plug positioned in the second cradle blocks access to the second cradle and the portal on a second side wall aligns with the first end of the second cradle providing access through the cover to the second cradle, and the second of the plurality of portals on the first side wall aligns with the first end of the first cradle providing access through the cover to the first cradle and the second side wall aligns with the second end of the first cradle blocking access to the first cradle; and a jumper plate positioned within the internal cavity of the cover, jumper plate being electrically conductive and having at least two insulation piercing members extending therefrom, the at least two insulation piercing members being electrically conductive, wherein a first of the at least two insulation piercing members is aligned with the first cradle when the cover is attached to the base, and wherein a second of the at least two insulation piercing members is aligned with the second cradle when the cover is attached to the base.

21. The connector according to claim 20, wherein the cover includes a plurality of test ports therethrough, and wherein one of the plurality of test ports is aligned with one of a plurality of test plates located within the internal cavity of the cover.

22. The connector according to claim 21, wherein each of the plurality of test plates includes at least two insulation piercing members extending from the test plate.

* * * * *